(12) United States Patent
Suginishi et al.

(10) Patent No.: US 11,170,327 B2
(45) Date of Patent: Nov. 9, 2021

(54) DYNAMIC PRODUCTION PLANNING SYSTEM AND DYNAMIC PRODUCTION PLANNING DEVICE

(71) Applicant: HITACHI, LTD., Tokyo (JP)

(72) Inventors: Yuuichi Suginishi, Tokyo (JP); Satoshi Fukuda, Tokyo (JP); Masataka Kan, Tokyo (JP); Yuuji Mizote, Tokyo (JP)

(73) Assignee: HITACHI, LTD., Tokyo (JP)

( * ) Notice: Subject to any disclaimer, the term of this patent is extended or adjusted under 35 U.S.C. 154(b) by 99 days.

(21) Appl. No.: 16/571,458

(22) Filed: Sep. 16, 2019

(65) Prior Publication Data

US 2020/0151633 A1 May 14, 2020

(30) Foreign Application Priority Data

Nov. 8, 2018 (JP) .............................. JP2018-210708

(51) Int. Cl.
*G06Q 10/06* (2012.01)
(52) U.S. Cl.
CPC ... *G06Q 10/06312* (2013.01); *G06Q 10/0635* (2013.01); *G06Q 10/06315* (2013.01)
(58) Field of Classification Search
CPC ....... G06Q 10/06312; G06Q 10/06315; G06Q 10/0635
USPC ...................................................... 705/7.22
See application file for complete search history.

(56) References Cited

U.S. PATENT DOCUMENTS

| 5,280,425 | A  | * | 1/1994 | Hogge ................... | G06Q 10/06 712/300 |
| 7,039,479 | B1 | * | 5/2006 | Lu ......................... | G06Q 10/00 700/97 |
| 7,359,874 | B2 | * | 4/2008 | Seaman ................. | G06Q 10/06 705/28 |
| 7,715,936 | B2 | * | 5/2010 | Thierauf ................ | G06Q 10/04 700/99 |
| 7,774,225 | B2 | * | 8/2010 | Cargille ........... | G06Q 10/06375 705/7.25 |
| 7,873,429 | B2 | * | 1/2011 | Boutemy ............... | F25J 3/0223 700/97 |
| 8,666,516 | B2 | * | 3/2014 | Sidner .................... | G06Q 10/06 700/36 |
| 9,417,829 | B2 | * | 8/2016 | Sheldon ................ | G06F 3/1204 |
| 10,037,018 | B2 | * | 7/2018 | Nomoto ............... | G06Q 10/067 |

(Continued)

FOREIGN PATENT DOCUMENTS

JP          2004-054332 A       2/2004

*Primary Examiner* — Romain Jeanty
(74) *Attorney, Agent, or Firm* — Mattingly & Malur, PC

(57) ABSTRACT

An object of the invention is to quickly provide an effective recovery plan for a delay problem occurring at a manufacturing site. A dynamic production planning system includes a dynamic production planning device, and the dynamic production planning device includes a process actual result storage unit that includes a record of time spent on production for each item and process, a process plan actual result storage unit that includes a production facility of which usage is planned and assumed work time thereof for each item and process, and a recovery scenario generating unit configured to calculate, for each item and process, an index indicating a risk of a delay using the time spent on production and the production facility of which usage is planned and the assumed work time thereof for each item and process.

12 Claims, 19 Drawing Sheets

(56) References Cited

U.S. PATENT DOCUMENTS

| | | | |
|---|---|---|---|
| 10,614,414 B1* | 4/2020 | Raymond | G06Q 10/087 |
| 10,852,714 B2* | 12/2020 | Fischer | G05B 19/41865 |
| 2009/0118854 A1* | 5/2009 | Urano | G06Q 10/06 700/102 |
| 2009/0292381 A1* | 11/2009 | Inoue | G06Q 10/06 700/101 |
| 2020/0058081 A1* | 2/2020 | Saneyoshi | G06Q 50/04 |

* cited by examiner

[FIG. 1]
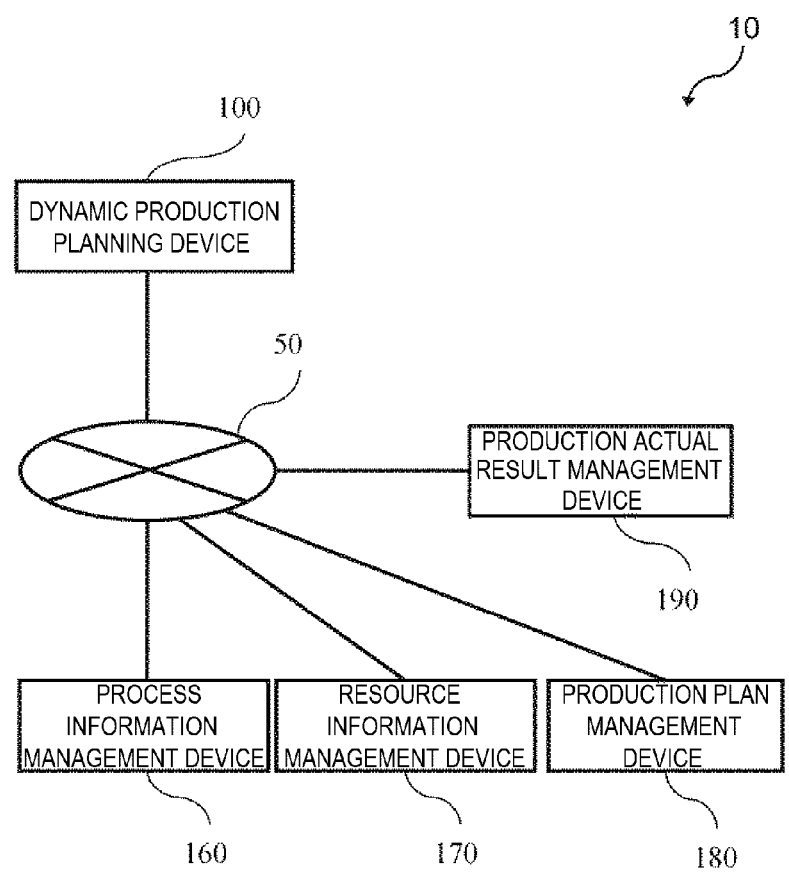

[FIG. 2]
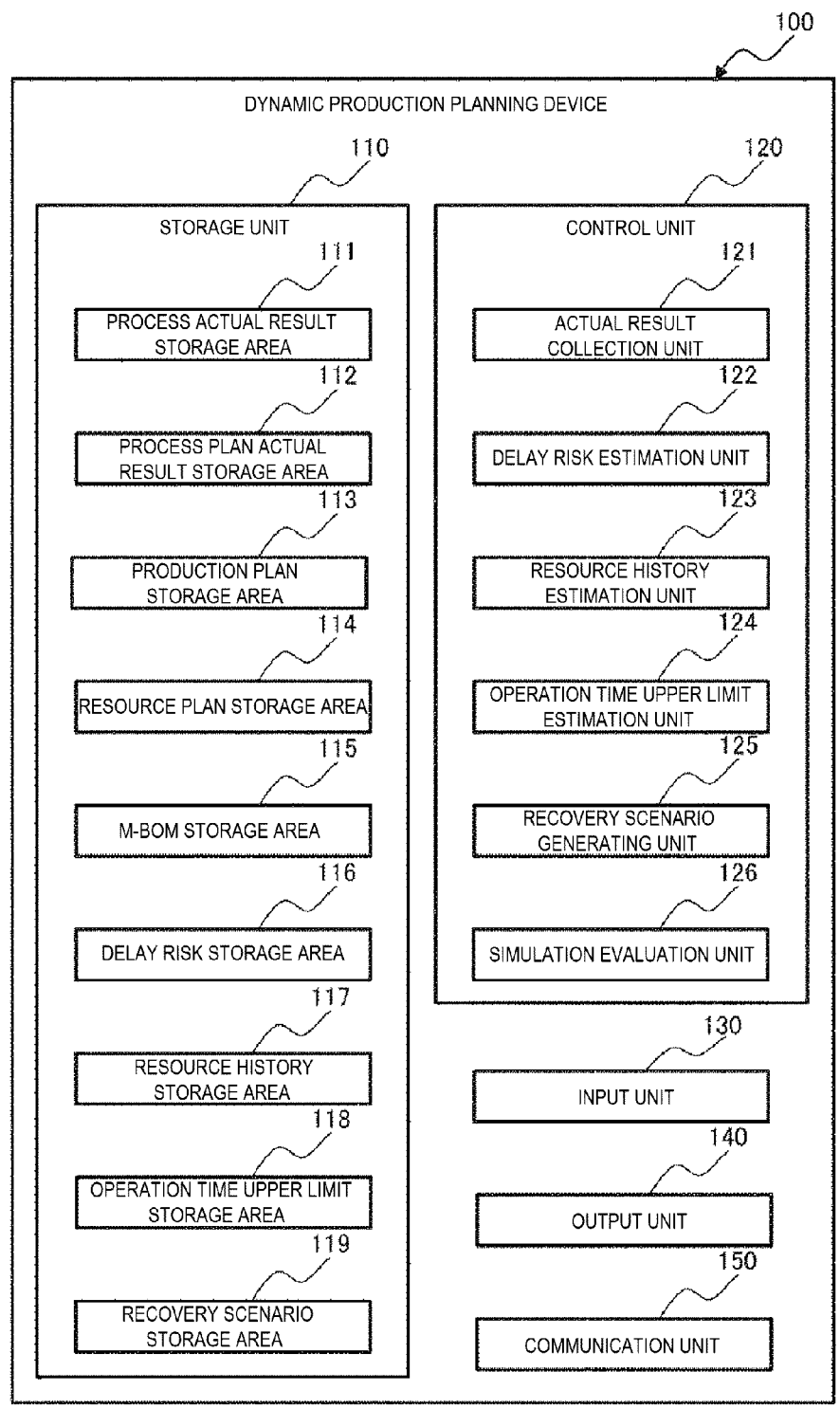

[FIG. 3]
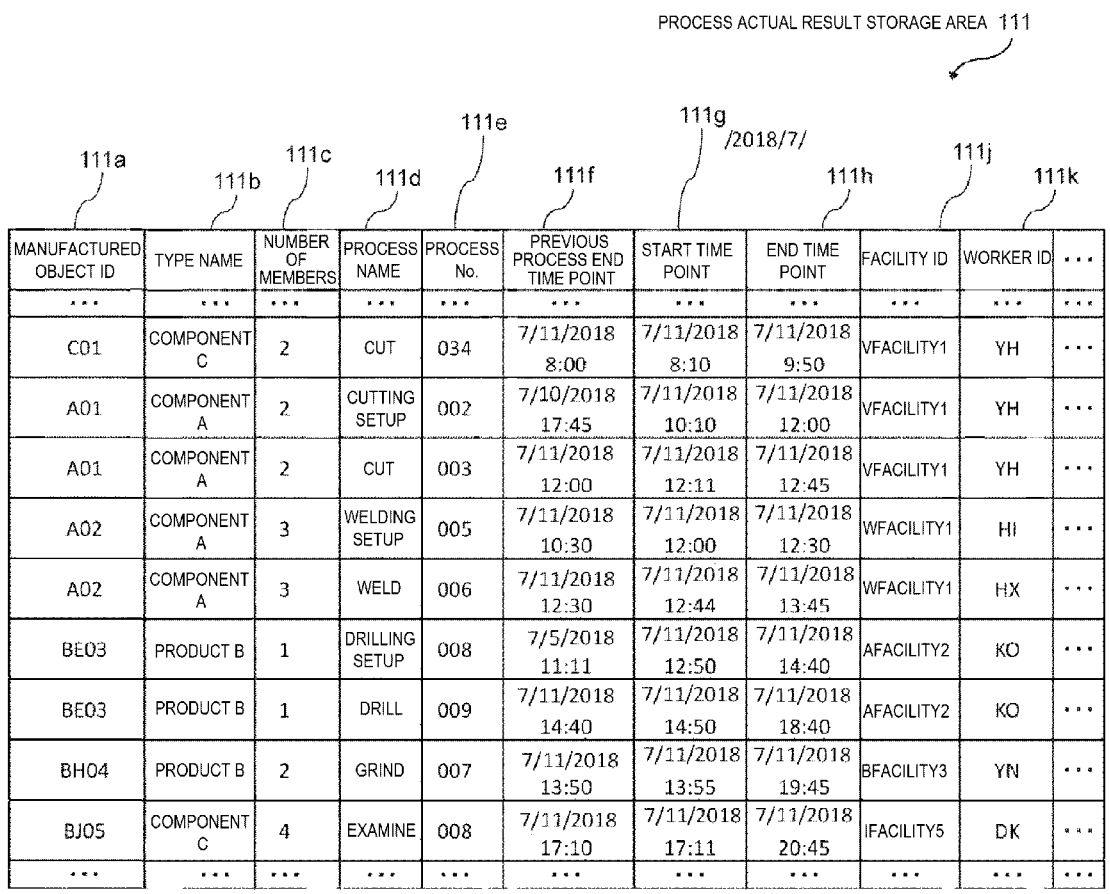

[FIG. 4]

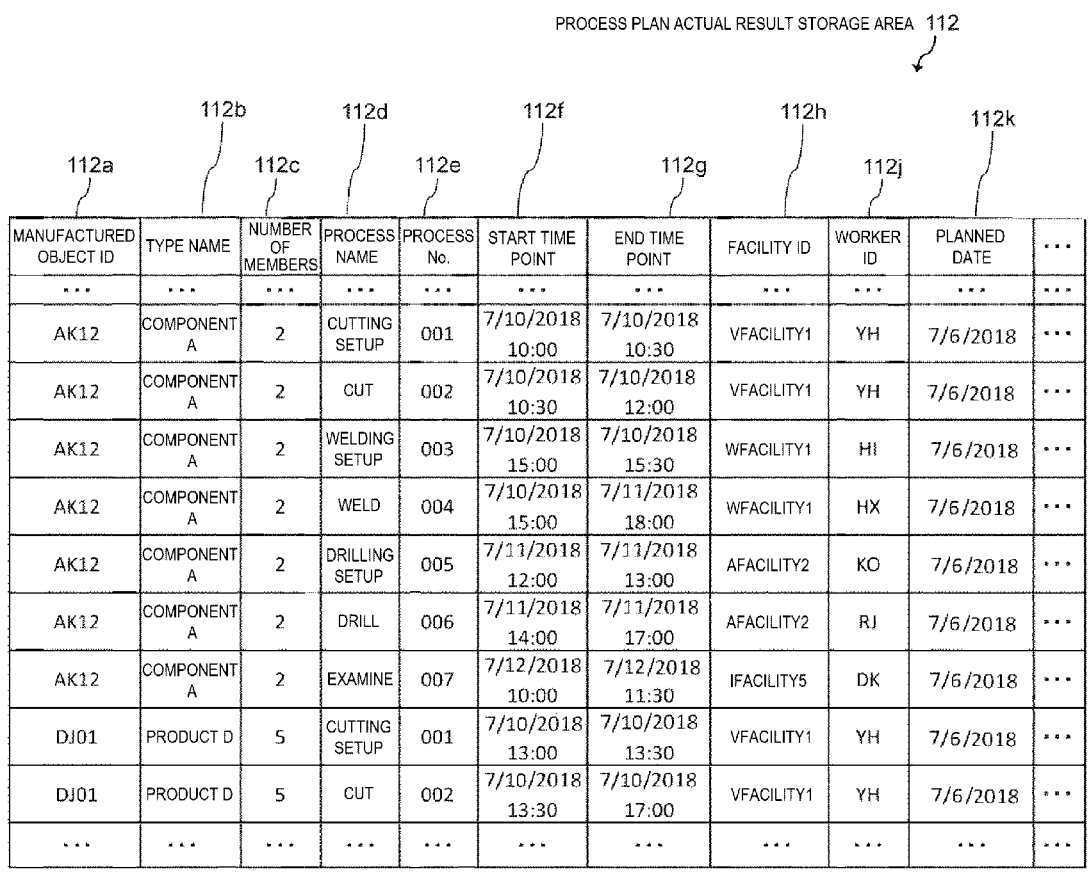

PROCESS PLAN ACTUAL RESULT STORAGE AREA 112

| MANUFACTURED OBJECT ID | TYPE NAME | NUMBER OF MEMBERS | PROCESS NAME | PROCESS No. | START TIME POINT | END TIME POINT | FACILITY ID | WORKER ID | PLANNED DATE | ... |
|---|---|---|---|---|---|---|---|---|---|---|
| ... | ... | ... | ... | ... | ... | ... | ... | ... | ... | ... |
| AK12 | COMPONENT A | 2 | CUTTING SETUP | 001 | 7/10/2018 10:00 | 7/10/2018 10:30 | VFACILITY1 | YH | 7/6/2018 | ... |
| AK12 | COMPONENT A | 2 | CUT | 002 | 7/10/2018 10:30 | 7/10/2018 12:00 | VFACILITY1 | YH | 7/6/2018 | ... |
| AK12 | COMPONENT A | 2 | WELDING SETUP | 003 | 7/10/2018 15:00 | 7/10/2018 15:30 | WFACILITY1 | HI | 7/6/2018 | ... |
| AK12 | COMPONENT A | 2 | WELD | 004 | 7/10/2018 15:00 | 7/11/2018 18:00 | WFACILITY1 | HX | 7/6/2018 | ... |
| AK12 | COMPONENT A | 2 | DRILLING SETUP | 005 | 7/11/2018 12:00 | 7/11/2018 13:00 | AFACILITY2 | KO | 7/6/2018 | ... |
| AK12 | COMPONENT A | 2 | DRILL | 006 | 7/11/2018 14:00 | 7/11/2018 17:00 | AFACILITY2 | RJ | 7/6/2018 | ... |
| AK12 | COMPONENT A | 2 | EXAMINE | 007 | 7/12/2018 10:00 | 7/12/2018 11:30 | IFACILITY5 | DK | 7/6/2018 | ... |
| DJ01 | PRODUCT D | 5 | CUTTING SETUP | 001 | 7/10/2018 13:00 | 7/10/2018 13:30 | VFACILITY1 | YH | 7/6/2018 | ... |
| DJ01 | PRODUCT D | 5 | CUT | 002 | 7/10/2018 13:30 | 7/10/2018 17:00 | VFACILITY1 | YH | 7/6/2018 | ... |
| ... | ... | ... | ... | ... | ... | ... | ... | ... | ... | ... |

[FIG. 5]

PRODUCTION PLAN STORAGE AREA 113

| MANUFACTURED OBJECT ID | TYPE NAME | NUMBER OF MEMBERS | INTRODUCTION (SCHEDULED) DATE | COMPLETION REQUEST DATE | PROCESS No. | STATE | START TIME POINT |
|---|---|---|---|---|---|---|---|
| ... | ... | ... | ... | ... | ... | ... | ... |
| AK12 | COMPONENT A | 2 | 7/9/2018 | 7/20/2018 | 008 | CONSTRUCTION WAITING | ... |
| BC02 | COMPONENT B | 3 | 7/1/2018 | 8/2/2018 | 015 | TRANSPORTING | 7/9/2018 12:00 |
| CJ05 | PRODUCT C | 1 | 5/15/2018 | 7/21/2018 | 031 | CONSTRUCTION STOP | ... |
| ... | ... | ... | ... | ... | ... | | |
| CE03 | PRODUCT C | 4 | 8/1/2018 | 8/29/2018 | | | |
| PH04 | TEST PRODUCT P | 2 | 8/10/2018 | 8/15/2018 | | | |
| ... | ... | ... | ... | ... | ... | ... | ... |

| 113a | 113b | 113c | 113d | 113e | 113f | 113g | 113h |

[FIG. 6]

RESOURCE PLAN STORAGE AREA 114

| RESOURCE TYPE | RESOURCE ID | WORK Gr | QUANTITY | PRODUCTION DATE | OPERATION START TIME POINT | OPERATION END TIME POINT | OPERATION TIME [MIN/RESOURCE] |
|---|---|---|---|---|---|---|---|
| Worker | HX | WELD | 1 | 8/1/2018 | 8:30 | 12:00 | 210 |
| Worker | HX | WELD | 1 | 8/1/2018 | 13:00 | 17:00 | 240 |
| Worker | HX | WELD | 1 | 8/2/2018 | 8:30 | 12:00 | 210 |
| Worker | HX | WELD | 1 | 8/2/2018 | 13:00 | 17:00 | 240 |
| Worker | HX | WELD | 1 | 8/2/2018 | 17:30 | 20:00 | 150 |
| Worker | SF | EXAMINE | 1 | 8/2/2018 | 8:30 | 12:00 | 210 |
| ... | ... | ... | ... | ... | ... | ... | ... |
| Machine | VFACILITY1 | - | 1 | 8/1/2018 | - | - | 1440 |
| Machine | VFACILITY1 | - | 1 | 8/2/2018 | 0:00 | 13:00 | 780 |
| Machine | VFACILITY1 | - | 1 | 8/2/2018 | 17:00 | 24:00 | 420 |
| Machine | IFACILITY3 | - | 5 | 8/2/2018 | - | - | 1440 |
| ... | ... | ... | ... | ... | ... | ... | ... |
| Jig | JA03 | - | 3 | 8/1/2018 | - | - | 1440 |
| ... | ... | ... | ... | ... | ... | ... | ... |

M-BOM STORAGE AREA 115

| TYPE NAME (115a) | PROCESS No. (115b) | PROCESS NAME (115c) | STANDARD TIME [MIN/PIECE] (115d) | QUANTITY DEPEND-ENCE (115e) | WORK Gr (115f) | NUMBER OF WORKERS (115g) | JIG ID (115h) | FACILITY1 ID (115j / 115k) | FACILITY2 ID (115m) | FACILITY3 ID (115n) | ... |
|---|---|---|---|---|---|---|---|---|---|---|---|
| ... | ... | ... | ... | ... | ... | ... | ... | ... | ... | ... | ... |
| PRODUCT B | 005 | OFF LINE SETUP | 10 | NO | PROCESSING | 2 | JA05 | | | | ... |
| PRODUCT B | 006 | FACILITY SETTING | 5 | YES | PROCESSING | 1 | JA05 | DFACILITY1 | DFACILITY3 | DFACILITY5 | ... |
| PRODUCT B | 007 | CUT PROCESSING | 180 | YES | PROCESSING | 0 | JA05 | SAME FACILITY AS 006 | | | ... |
| PRODUCT B | 008 | TAKE OUT | 30 | NO | PROCESSING | 2 | JA05 | SAME FACILITY AS 006 | | | ... |
| PRODUCT B | 009 | POST PROCESSING | 10 | NO | PROCESSING | 1 | - | SAME FACILITY AS 006 | | | ... |
| PRODUCT B | 010 | EXAMINE | 120 | YES | EXAMINE | 1 | - | IFACILITY2 | | | ... |
| PRODUCT B | 011 | TRANSPORT | 30 | NO | TRANSPORT | 1 | - | AGV2 | AGV5 | | ... |
| ... | ... | ... | ... | ... | ... | ... | ... | ... | ... | ... | ... |
| TEST PRODUCT A | 125 | OFF LINE SETUP | 20 | NO | PROCESSING | 1 | JG01 | | | | ... |
| TEST PRODUCT A | 126 | FACILITY SETTING | 10 | YES | PROCESSING | 1 | JG01 | SFACILITY2 | | | ... |
| TEST PRODUCT A | 127 | HEAT PROCESSING | 15 | NO | PROCESSING | 0 | JG01 | SAME FACILITY AS 126 | | | ... |
| TEST PRODUCT A | 128 | GRIND | 60 | YES | PROCESSING | 0 | JG01 | SAME FACILITY AS 126 | | | ... |
| TEST PRODUCT A | 129 | TAKE OUTSIDE | 15 | NO | PROCESSING | 1 | JG01 | SAME FACILITY AS 126 | | | ... |
| TEST PRODUCT A | 130 | CLEAN | 200 | NO | EXAMINE | 1 | - | WFACILITY1 | WFACILITY2 | | ... |
| ... | ... | ... | ... | ... | ... | ... | ... | ... | ... | ... | ... |

[FIG. 8]

DELAY RISK STORAGE AREA 116

| TYPE NAME | PROCESS No. | PROCESS NAME | WORK DELAY RISK | CONSTRUCTION DELAY RISK | UPSTREAM DELAY RISK |
|---|---|---|---|---|---|
| ... | ... | ... | ... | ... | ... |
| PRODUCT B | 007 | CUT PROCESSING | 5 | 0.4 | 20 |
| PRODUCT B | 010 | EXAMINE | 1 | 1 | 30 |
| ... | ... | ... | ... | ... | ... |
| PRODUCT F | 128 | GRIND | 2 | 30 | 1 |
| PRODUCT G | 130 | CLEAN | 10 | 3 | 2 |
| ... | ... | ... | ... | ... | ... |

116a　116b　116c　116d　116e　116f

[FIG. 9]
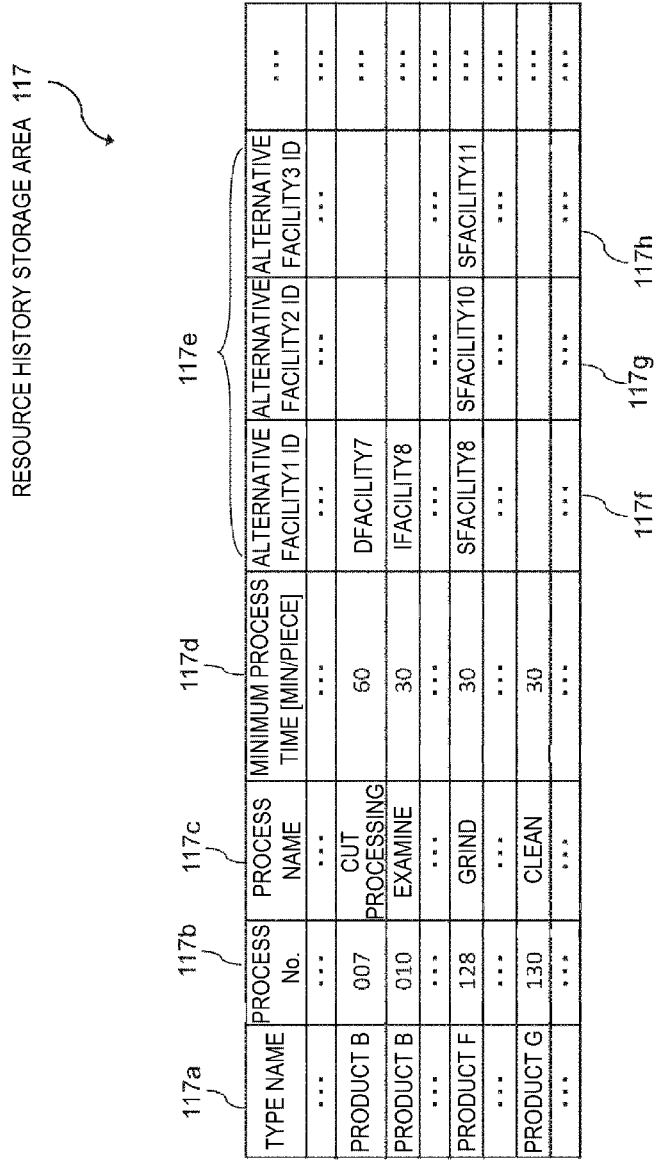

[FIG. 10]

OPERATION TIME UPPER LIMIT STORAGE AREA 118

| RESOURCE TYPE (118a) | RESOURCE ID (118b) | WORK Gr (118c) | QUANTITY (118d) | DAY OF WEEK (118e) | NORMAL OPERATION TIME [MIN/RESOURCE] (118f) | OPERATION TIME UPPER LIMIT [MIN/RESOURCE] (118g) |
|---|---|---|---|---|---|---|
| Worker | HX | WELD | 1 | MONDAY | 480 | 600 |
| Worker | HX | WELD | 1 | TUESDAY | 480 | 600 |
| Worker | HX | WELD | 1 | WEDNESDAY | 480 | 480 |
| ... | ... | ... | ... | ... | ... | ... |
| Worker | TA | WELD | 1 | MONDAY | 480 | 540 |
| Worker | TA | WELD | 1 | TUESDAY | 480 | 600 |
| ... | ... | ... | ... | ... | ... | ... |
| Worker | SF | EXAMINE | 1 | SATURDAY | 0 | 600 |
| Worker | SF | EXAMINE | 1 | SUNDAY | 0 | 480 |
| ... | ... | ... | ... | ... | ... | ... |
| Machine | VFACILITY1 | | 1 | | 1440 | 1440 |
| Machine | IFACILITY3 | | 5 | | 1320 | 1380 |
| ... | ... | ... | ... | ... | ... | ... |
| Jig | JA03 | | 3 | | 1440 | 1440 |
| ... | ... | ... | ... | ... | ... | ... |

[FIG. 11]

RECOVERY SCENARIO STORAGE AREA 119

| TYPE NAME 119a | PROCESS No. 119b | PROCESS NAME 119c | RECOVERY SCENARIO PRESENCE/ABSENCE 119d | ALTERNATIVE FACILITY PRESENCE/ABSENCE 119e | PROCESS TIME SHORTENING POSSIBILITY 119f | OPERATION TIME EXTENSION POSSIBILITY 119g | RECOVERY SEQUENCE 119h |
|---|---|---|---|---|---|---|---|
| ... | ... | ... | ... | ... | ... | ... | ... |
| PRODUCT B | 007 | CUT PROCESSING | PRESENT | PRESENT | NO | YES | UPSTREAM |
| PRODUCT B | 010 | EXAMINE | ABSENT | ABSENT | NO | NO | CURRENT |
| ... | ... | ... | ... | ... | ... | ... | ... |
| PRODUCT F | 128 | GRIND | PRESENT | ABSENT | NO | YES | UPSTREAM |
| ... | ... | ... | ... | ... | ... | ... | ... |
| PRODUCT G | 130 | CLEAN | PRESENT | PRESENT | YES | YES | CURRENT |
| ... | ... | ... | ... | ... | ... | ... | ... |

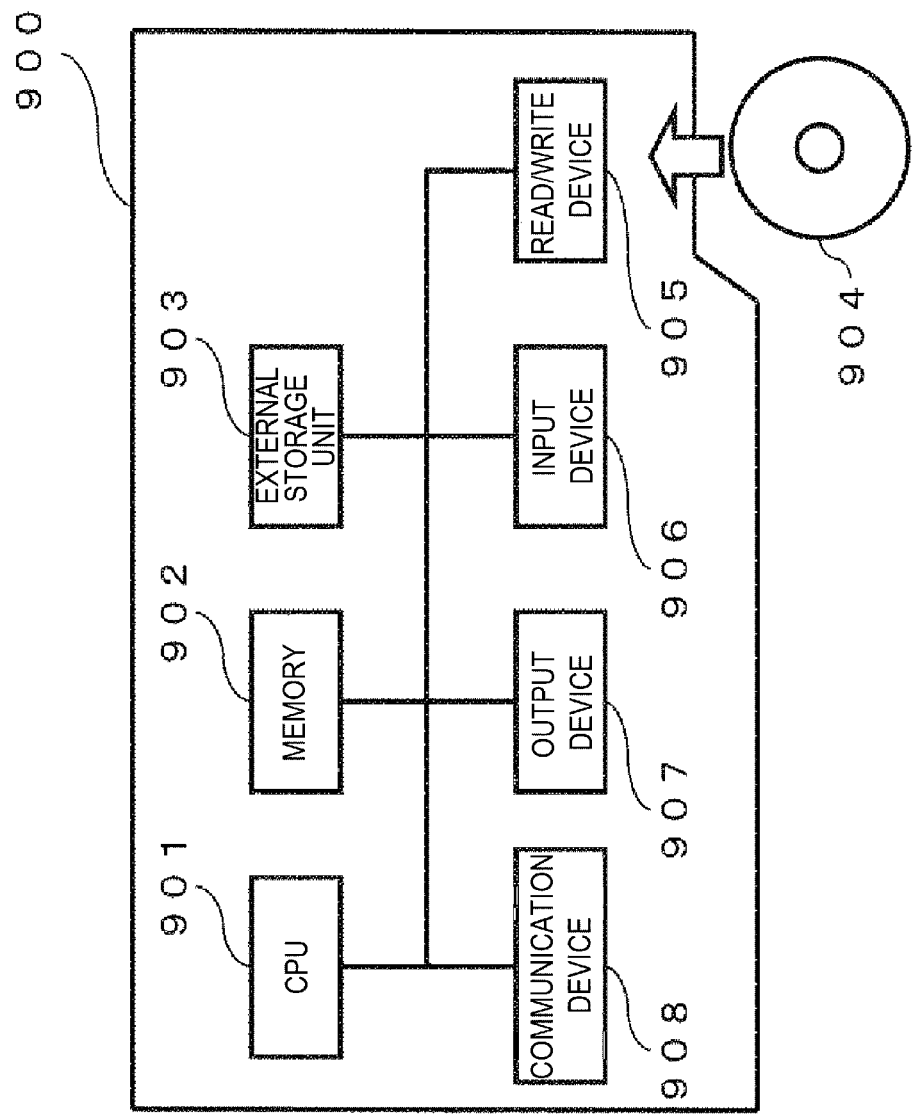
[FIG. 12]

[FIG. 13]
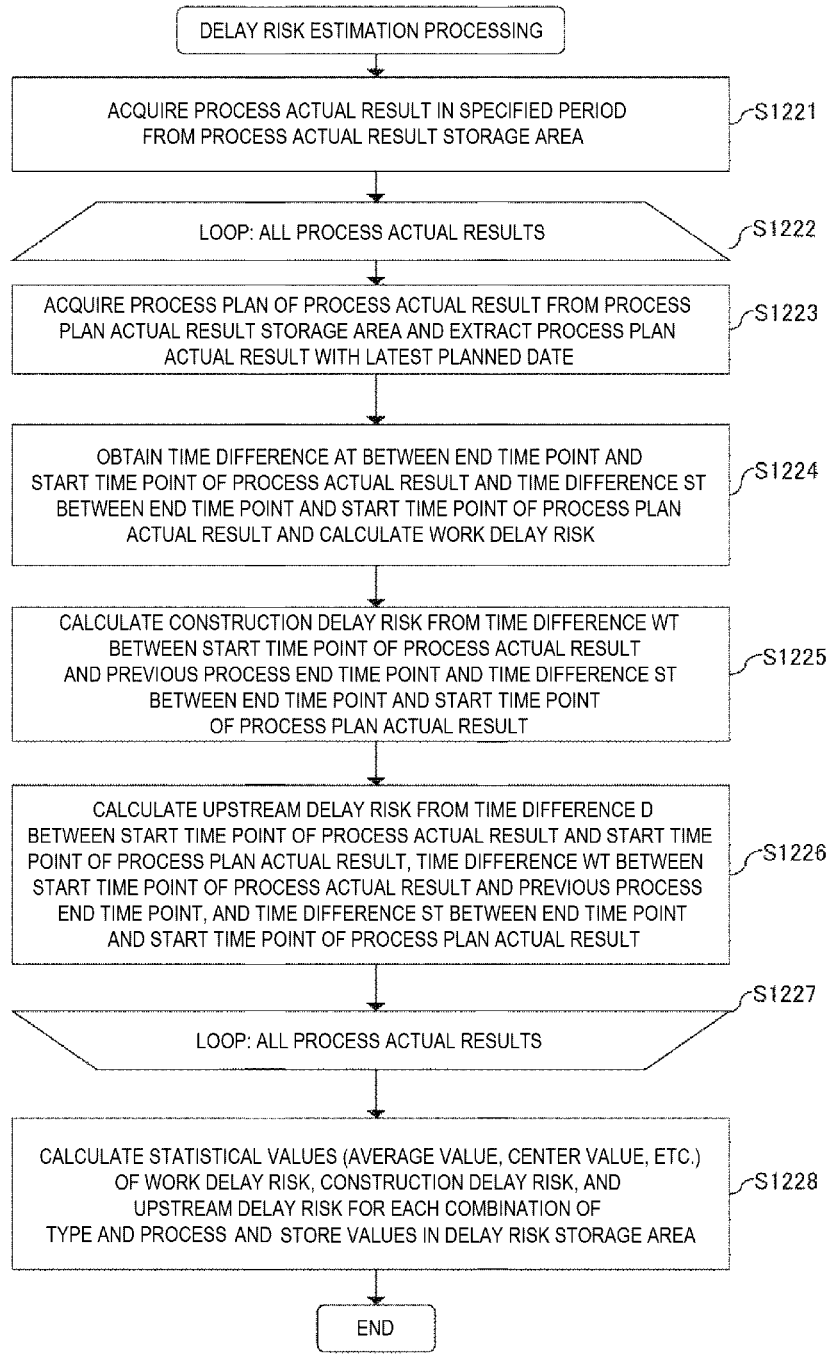

[FIG. 14]
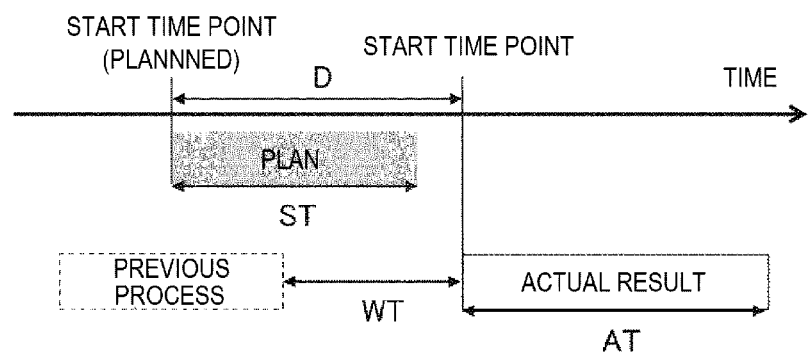
$$\text{WORK DELAY RISK} = \frac{AT-ST}{ST}$$
$$\text{CONSTRUCTION DELAY RISK} = \frac{WT}{ST}$$
$$\text{UPSTREAM DELAY RISK} = \frac{D-WT}{ST}$$

[FIG. 15]
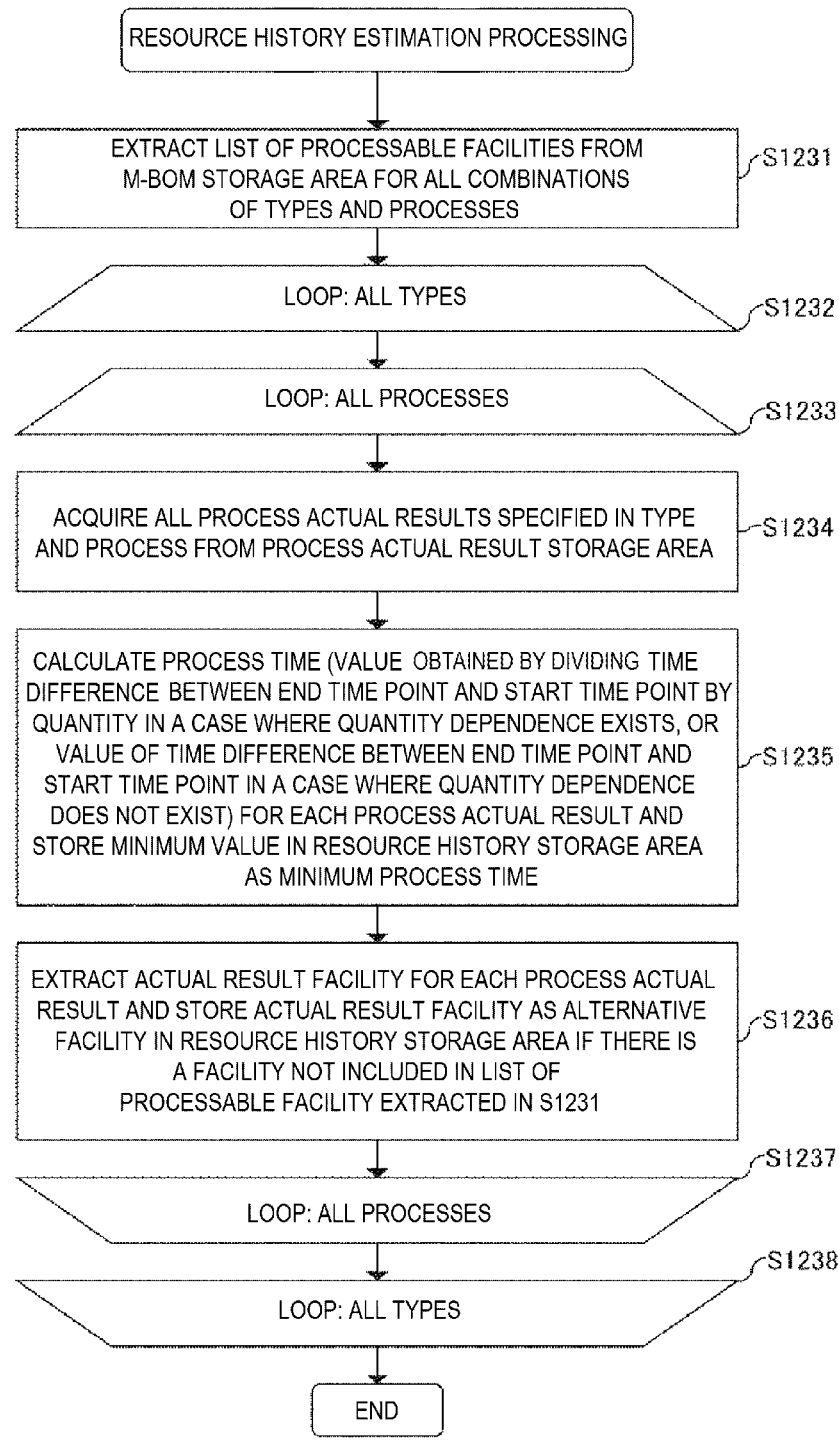

[FIG. 16]
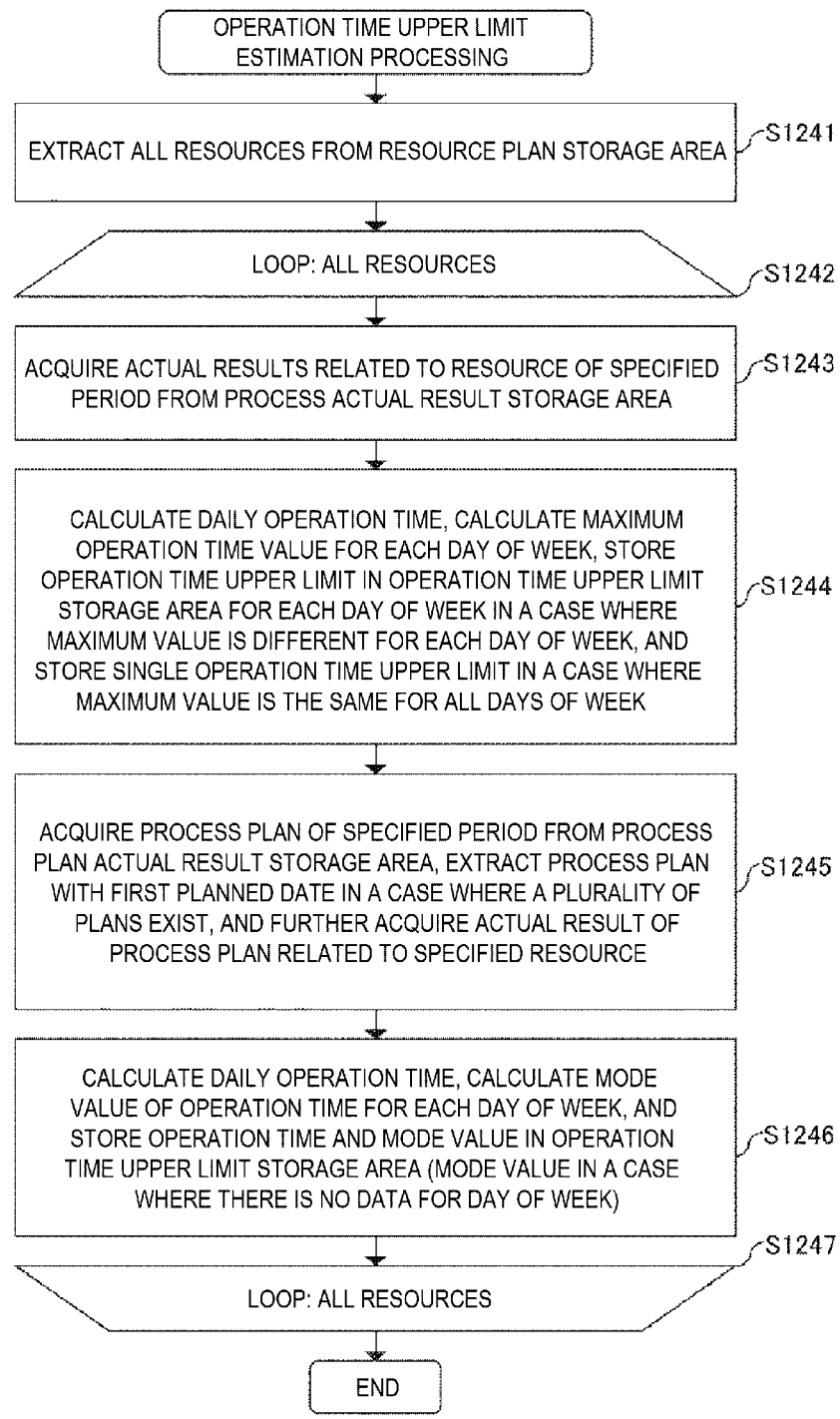

[FIG. 17]
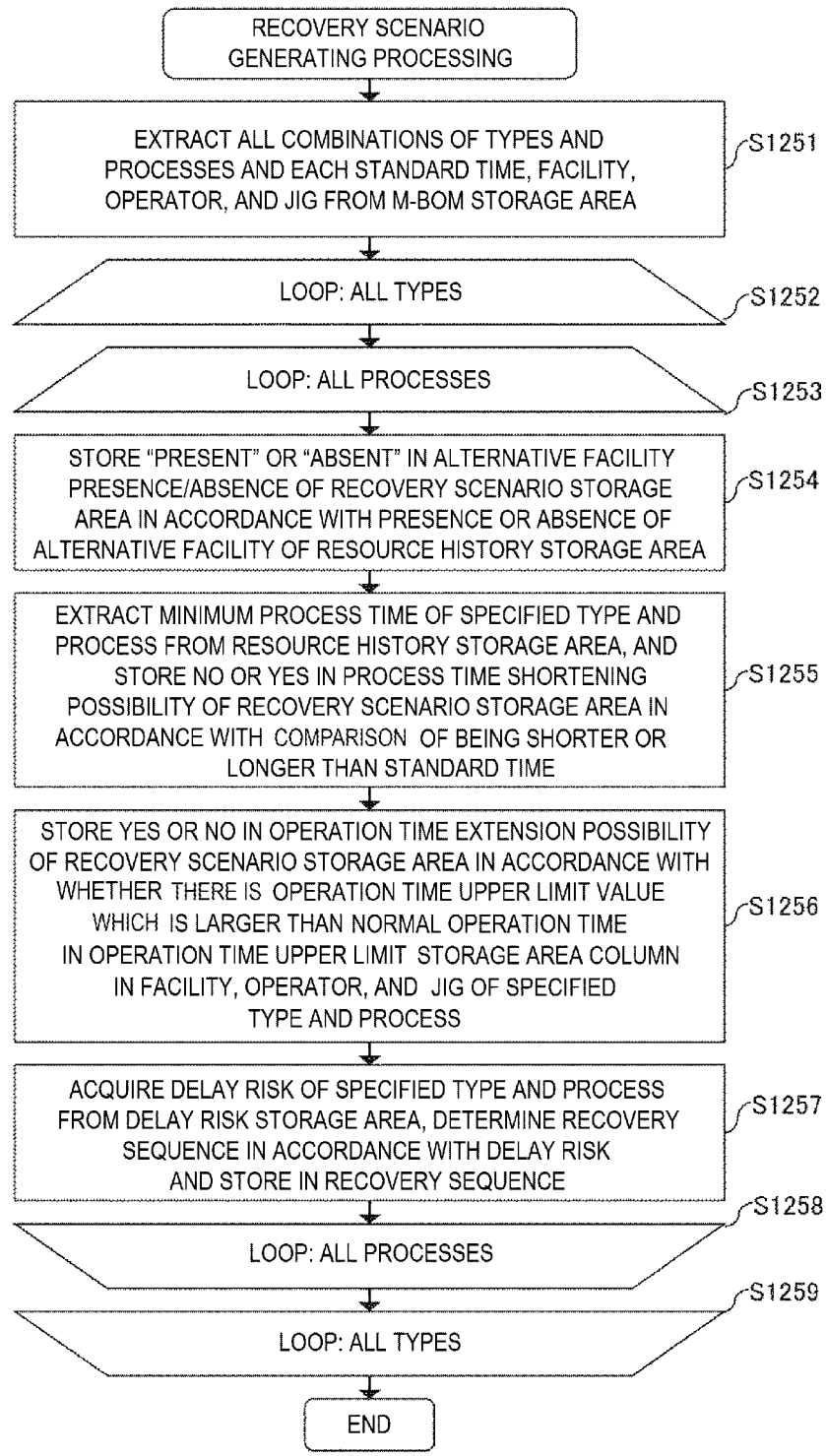

[FIG. 18]
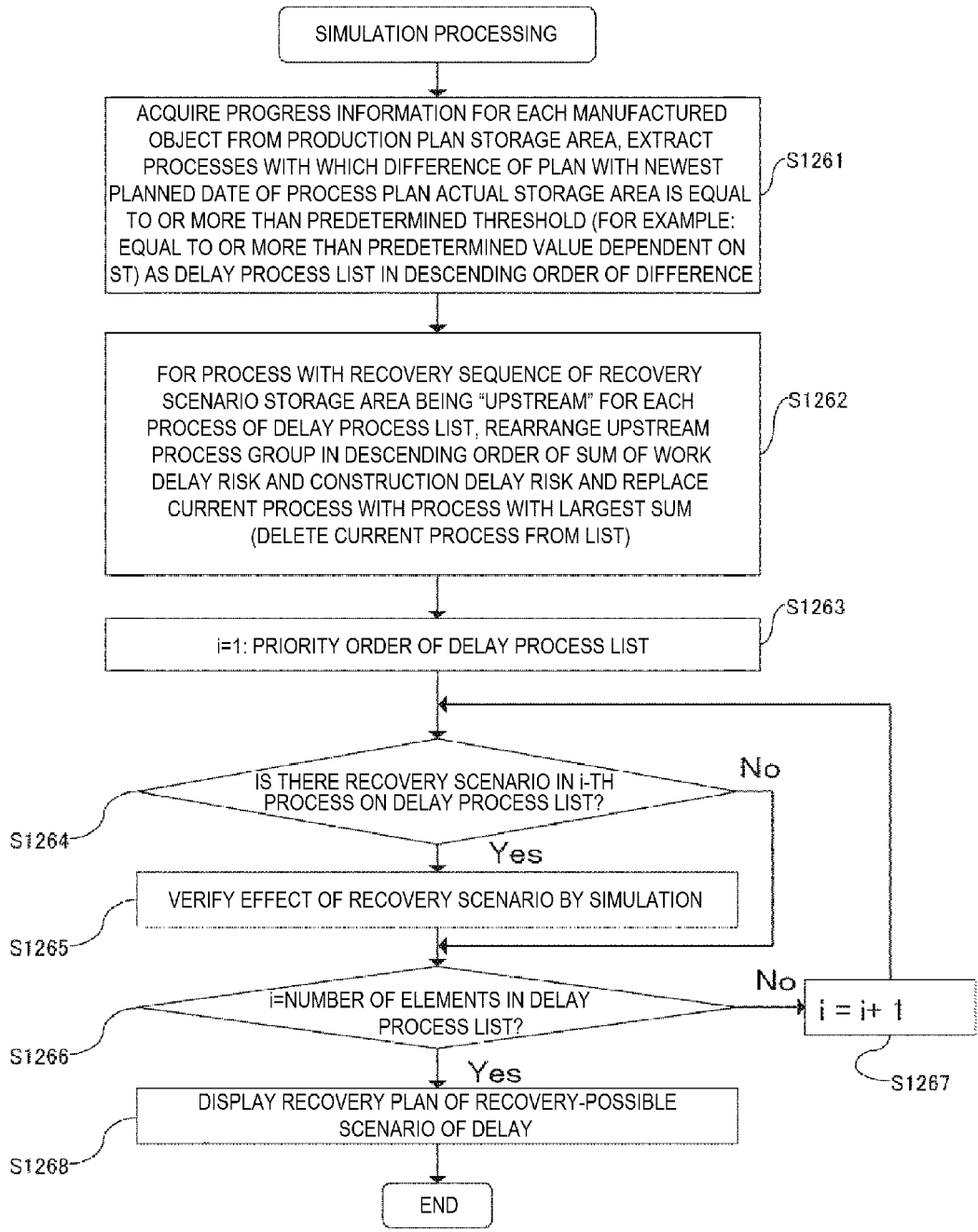

[FIG. 19]
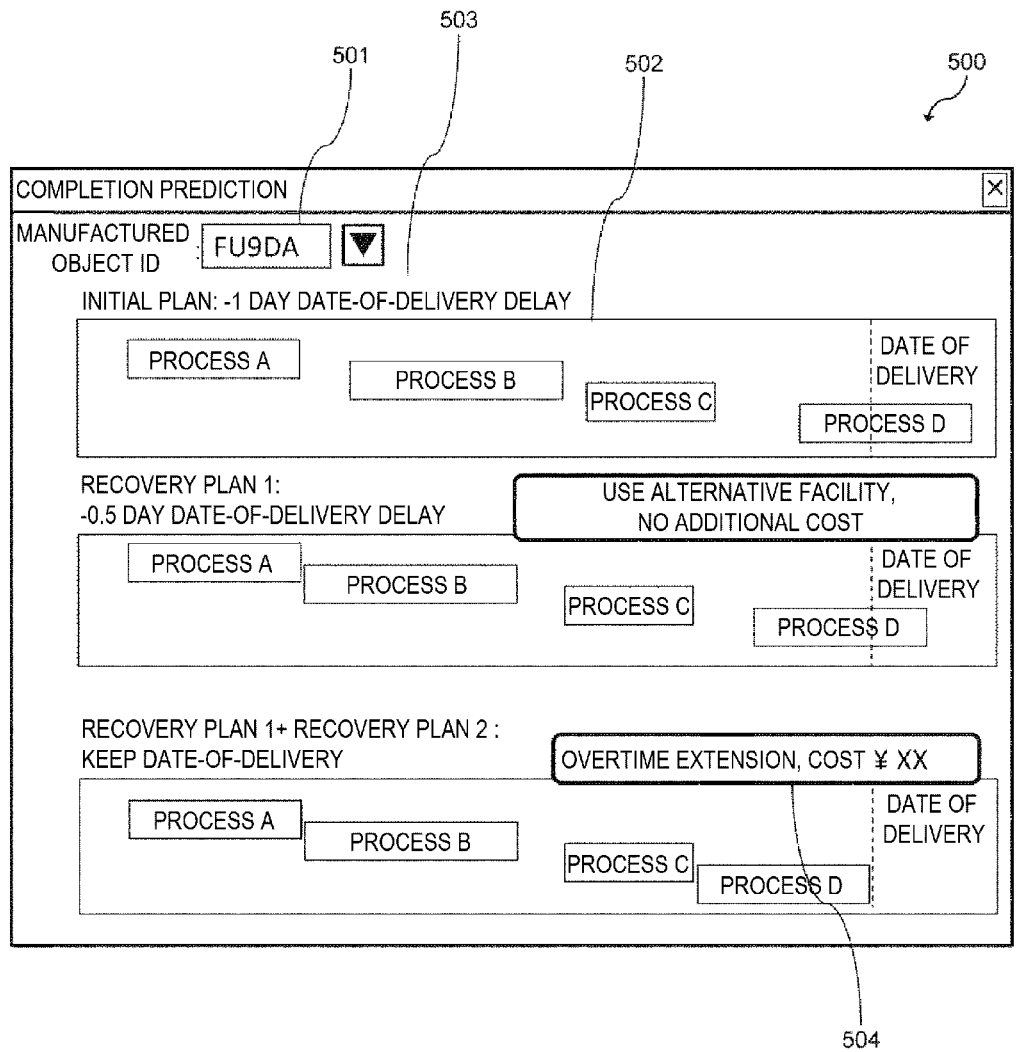

DYNAMIC PRODUCTION PLANNING SYSTEM AND DYNAMIC PRODUCTION PLANNING DEVICE

CROSS-REFERENCE TO RELATED APPLICATION

The present application claims priority from Japanese application JP 2018-210708, filed on Nov. 8, 2018, the contents of which is hereby incorporated by reference into this application.

TECHNICAL FIELD

The present invention relates to a dynamic production planning system and a dynamic production planning device.

BACKGROUND ART

JP-A-2004-54332 (PTL 1) is a background art in the technical field. It is described in the publication that, in a work form in which a plurality of works requiring specialized knowledge and experience are deployed and performed in parallel, as means to present a recovery plan when a delay occurs in a work process, a measurement for delay is provided without complicated work by outputting work item information that includes, for each work item, work deployment, progress situation, information such as knowledge and experience necessary for performing the work, man-hours being input, and a schedule of the work.

PRIOR ART LITERATURE

Patent Literature

PTL 1: JP-A-2004-054332

SUMMARY OF INVENTION

Technical Problem

According to the technique described in PTL 1, the work deployment, the progress situation, the information such as knowledge and experience necessary for performing the work, for each work item, which are provided information, are assumed to be manually provided based on a past actual result, and the man-hour of preparation increases in a large-scale factory or a factory for producing a variety of products.

An object of the invention is to quickly provide an effective recovery plan for a delay problem occurring at a manufacturing site.

Solution to Problem

The present application includes a plurality of means for solving at least a part of the problems described above, and an example is as follows. In order to solve the above problems, a dynamic production planning system according to an aspect of the invention includes a dynamic production planning device, and the dynamic production planning device includes a process actual result storage unit that includes a record of time spent on production for each item and process, a process plan actual result storage unit that includes a production facility of which usage is planned and assumed work time thereof for each item and process, and a recovery scenario generating unit configured to calculate, for each item and process, an index indicating a risk of a delay using the time spent on production and the production facility of which usage is planned and the assumed work time thereof for each item and process.

Advantageous Effect

According to the invention, it is possible to quickly provide the effective recovery plans for the delay problems occurring at the manufacturing site. As a result, it is possible to optimize production indexes according to the purpose, such as an improvement of an operation rate of a manufacturing device, an increase of a production volume, a reduction of manufacturing lead time, and keeping of date-of-delivery, thereby realizing a manufacturing site with high productivity. Problems, configurations, and effects other than those described above will become apparent according to the following description of embodiments.

BRIEF DESCRIPTION OF DRAWINGS

FIG. 1 illustrates a configuration example of a dynamic production planning system according to a first embodiment of the invention.
FIG. 2 illustrates a configuration example of a dynamic production planning device.
FIG. 3 illustrates an example of a data structure of a process actual result storage area.
FIG. 4 illustrates an example of a data structure of a process plan actual result storage area.
FIG. 5 illustrates an example of a data structure of a production plan storage area.
FIG. 6 illustrates an example of a data structure of a resource plan storage area.
FIG. 7 illustrates an example of a data structure of an M-BOM storage area.
FIG. 8 illustrates an example of a data structure of a delay risk storage area.
FIG. 9 illustrates an example of a data structure of a resource history storage area.
FIG. 10 illustrates a data structure of an operation time upper limit storage area.
FIG. 11 illustrates an example of a data structure of a recovery scenario storage area.
FIG. 12 illustrates an example of a hardware configuration of the dynamic production planning device.
FIG. 13 illustrates an example of a flow of delay risk estimation processing.
FIG. 14 illustrates a calculation structure of various risks.
FIG. 15 illustrates an example of a flow of resource history estimation processing.
FIG. 16 illustrates an example of a flow of operation time upper limit estimation processing.
FIG. 17 illustrates an example of a flow of recovery scenario generating processing.
FIG. 18 illustrates an example of a flow of simulation processing.
FIG. 19 illustrates an example of an output screen of the simulation processing.

DESCRIPTION OF EMBODIMENTS

An embodiment of the invention will be described below with reference to the drawings. In all the drawings for describing the embodiment, the same components are denoted by the same reference numerals in principle, and the repetitive description thereof will be omitted. In addition, in the embodiment to be described below, it is needless to say that the constituent elements (including element process and the like) are not necessarily essential except when the constituent elements (including the element process and the like) are particularly stated or considered to be apparently essential in principle. In addition, it is needless to say that expressions "formed of A", "made of A", "having A", and "including A" do not exclude elements other than A unless otherwise stated that A is the only element thereof. Similarly, in the following embodiments, when referring to shapes of the constituent elements, positional relationships thereof, and the like, it is assumed that substantially approximate and similar shapes and the like are included therein unless otherwise stated or except the case where it is conceivable that they are apparently excluded in principle.

FIG. 1 illustrates a configuration example of a dynamic production planning system according to a first embodiment of the invention. A dynamic production planning system 10 includes a dynamic production planning device 100, a process information management device 160, a resource information management device 170, a production plan management device 180, a production actual result management device 190, and a network 50 that connects the above and enables communication.

The network 50 is any one of a communication network using a part or all of a general public line such as a local area network (LAN), a wide area network (WAN), a virtual private network (VPN), or the Internet, or a mobile phone communication network, and the like.

The dynamic production planning device 100 creates a production plan based on information acquired from the production actual result management device 190, the process information management device 160, the resource information management device 170, and the production plan management device 180. The dynamic production planning device 100 will be described in detail later.

The process information management device 160 manages process design information in manufacture of a manufactured object, and transmits the process design information to the dynamic production planning device 100 at a predetermined time or in response to a request from the dynamic production planning device 100.

The resource information management device 170 manages information of resources such as production facilities, workers, jigs at the manufacturing site, and transmits information related to production facilities to the dynamic production planning device 100 at a predetermined time or in response to a request from the dynamic production planning device 100.

The production plan management device 180 manages production plan information such as scheduled introduction time point and completion date of delivery of the manufactured object, and transmits the production plan information to the dynamic production planning device 100 at a predetermined time or in response to a request from the dynamic production planning device 100.

The production actual result management device 190 transmits a log that is actual result information related to manufacture to the dynamic production planning device 100 at a predetermined time or in response to a request from the dynamic production planning device 100. The production actual result management device 190 may manage the work actual result information of all manufacturing sites by one set, or may be provided as many as the number of manufacturing sites and each of which manages each manufacturing site.

The dynamic production planning device 100, the production actual result management device 190, the process information management device 160, the resource information management device 170, and the production plan management device 180 can extract production actual result information data, process path information data, production facility information data, process design information data, and the like obtained by a Manufacturing Executing System (MES) for managing a target manufacturing site, and transmit the above data to a control unit 120 (see FIG. 2) of the dynamic production planning device 100 via the network 50.

FIG. 2 illustrates a configuration example of a dynamic production planning device 100. As illustrated, the dynamic production planning device 100 includes a storage unit 110, the control unit 120, an input unit 130, an output unit 140, and a communication unit 150.

The storage unit 110 includes a process actual result storage area 111, a process plan actual result storage area 112, a production plan storage area 113, a resource plan storage area 114, an M-BOM storage area 115, a delay risk storage area 116, a resource history storage area 117, an operation time upper limit storage area 118, and a recovery scenario storage area 119.

In the process actual result storage area 111, information for specifying the operation (processing) of the process, a time point at which the operation (processing) is started, a time point at which the operation (processing) is ended, a work (processing) production facility, a specified jig, and a worker who performed the work (processing) are stored for each manufactured object such as a component or a product.

FIG. 3 illustrates an example of a data structure of the process actual result storage area. The process actual result storage area 111 stores information input from the production actual result management device 190.

The process actual result storage area 111 includes a manufactured object ID column 111a, a type name column 111b, a number-of-members column 111c, a process name column 111d, a process No. column 111e, a previous process end time point column 111f, a start time point column 111g, an end time point column 111h, a facility ID column 111j, and a worker ID column 111k. The manufactured object ID column 111a, the type name column 111b, the number-of-members column 111c, the process name column 111d, the process No. column 111e, the previous process end time point column 111f, the start time point column 111g, the end time point column 111h, the facility ID column 111j, and the worker ID column 111k are associated one another.

The manufactured object ID column 111a stores information for specifying a manufactured object ID, which is identification information capable of uniquely identifying a manufacturing unit (for example, a lot) of each manufactured object (sometimes referred to as a product) or component and the like.

The type name column 111b stores information for specifying a type of the manufactured object specified in the manufactured object ID column 111a.

The number-of-members column 111c stores information for specifying the quantity of the manufactured objects specified in the manufactured object ID column 111a.

The process name column 111d stores information for specifying a process name for identifying a process in which the manufactured object specified in the manufactured object ID column 111a was processed.

The process No. column 111e stores information for specifying the number of the process counted from a process from which processing of processes in the process name column 111*d* is started for the manufactured object specified in the manufactured object ID column 111*a*.

The previous process end time point column 111*f* stores information for specifying a time point at which a previous process of the process specified in the process name column 111*d* is ended for the manufactured object specified in the manufactured object ID column 111*a*.

The start time point column 111*g* stores information for specifying a time point at which the processing of the process specified in the process name column 111*d* is started for the manufactured object specified in the manufactured object ID column 111*a*.

The end time point column 111*h* stores information for specifying a time point at which the processing of a production process specified in the process name column 111*d* is ended for the manufactured object specified in the manufactured object ID column 111*a*.

The facility ID column 111*j* stores information for specifying a facility ID assigned to processing in the process specified in the process name column 111*d* in a period from the start time point specified in the start time point column 111*g* to the end time point specified in the end time point column 111*h* for the manufactured object specified in the manufactured object ID column 111*a*.

The worker ID column 111*k* stores information for specifying a worker ID assigned to processing in the process specified in the process name column 111*d* in a period from the start time point specified in the start time point column 111*g* to the end time point specified in the end time point column 111*h* for the manufactured object specified in the manufactured object ID column 111*a*.

The description is returned to FIG. 2. The actual result of a process plan is stored in the process plan actual result storage area 112.

FIG. 4 illustrates an example of a data structure of the process plan actual result storage area. The process plan actual result storage area 112 stores information input from the production plan management device 180.

The process plan actual result storage area 112 includes a manufactured object ID column 112*a*, a type name column 112*b*, a number-of-members column 112*c*, a process name column 112*d*, a process No. column 112*e*, a start time point column 112*f*, an end time point column 112*g*, a facility ID column 112*h*, a worker ID column 112*j*, and a planned date column 112*k*. The manufactured object ID column 112*a*, the type name column 112*b*, the number-of-members column 112*c*, the process name column 112*d*, the process No. column 112*e*, the start time point column 112*f*, the end time point column 112*g*, the facility ID column 112*h*, the worker ID column 112*j*, and the planned date column 112*k* are associated one another.

The manufactured object ID column 112*a* stores information for specifying a manufactured object ID, which is identification information capable of uniquely identifying a manufacturing unit of each product or component and the like.

The type name column 112*b* stores information for specifying a type of the manufactured object specified in the manufactured object ID column 112*a*.

The number-of-members column 112*c* stores information for specifying the quantity of the manufactured objects specified in the manufactured object ID column 112*a*.

The process name column 112*d* stores information for specifying a process name for identifying a process in which the manufactured object specified in the manufactured object ID column 112*a* was processed.

The process No. column 112*e* stores information for specifying the number of the process counted from a process from which processing of processes in the process name column 112*d* is started for the manufactured object specified in the manufactured object ID column 112*a*.

The start time point column 112*f* stores information for specifying a planned value of a time point at which the processing of the process specified in the process name column 112*d* is started for the manufactured object specified in the manufactured object ID column 112*a*.

The end time point column 112*g* stores information for specifying a planned value of a time point at which the processing of the process specified in the process name column 112*d* is ended for the manufactured object specified in the manufactured object ID column 112*a*.

The facility ID column 112*h* stores information for specifying a facility ID of a plan used in processing in a process specified in the process name column 112*d* in a period from the start time point specified in the start time point column 112*f* to the end time point specified in the end time point column 112*g* for the manufactured object specified in the manufactured object ID column 112*a*.

The worker ID column 112*j* stores information for specifying a worker ID assigned to processing in the process specified in the process name column 112*d* in a period from the start time point specified in the start time point column 112*f* to the end time point specified in the end time point column 112*g* for the manufactured object specified in the manufactured object ID column 112*a*.

The planned date column 112*k* stores information for specifying a planned date for a plan assigned to a worker with the worker ID that is specified in the worker ID column 112*j* using a facility with the facility ID specified in the facility ID column 112*h* in a process specified in the process name column 112*d* in a period from the start time point specified in the start time point column 112*f* to the end time point specified in the end time point column 112*g* for the manufactured object specified in the manufactured object ID column 112*a*.

The description is returned to FIG. 2. The production plan storage area 113 stores production plan information of the manufactured object and information related to a position and state of an in-process manufactured object.

FIG. 5 illustrates an example of a data structure of the production plan storage area. The production plan storage area 113 stores information input from the production plan management device 180.

The production plan storage area 113 includes a manufactured object ID column 113*a*, a type name column 113*b*, a number-of-members column 113*c*, an introduction (scheduled) date column 113*d*, a completion request date column 113*e*, a process No. column 113*f*, a state column 113*g*, and a start time point column 113*h*. The manufactured object ID column 113*a*, the type name column 113*b*, the number-of-members column 113*c*, the introduction (scheduled) date column 113*d*, the completion request date column 113*e*, the process No. column 113*f*, the state column 113*g*, and the start time point column 113*h* are associated one another.

The manufactured object ID column 113*a* stores information for specifying a manufactured object ID, which is identification information capable of uniquely identifying a manufacturing unit of each product or component and the like.

The type name column 113*b* stores information for specifying a type of the manufactured object specified in the manufactured object ID column 113*a*.

The number-of-members column 113c stores information for specifying the quantity of manufactured objects included in the manufactured objects specified in the manufactured object ID column 113a.

The introduction (scheduled) date column 113d stores information for specifying a date on which the manufactured object specified in the manufactured object ID column 113a was introduced to an initial process in a case of already being produced, or information for specifying an introduction date in a case before the introduction.

The completion request date column 113e stores information for specifying a completion date of the manufactured object specified in the manufactured object ID column 113a.

The process No. column 113f stores information for specifying the number of a process counted from a process from which the in-process processing of the manufactured object specified in the manufactured object ID column 113a is started. In a case where the manufactured object specified in the product ID column 113a is not introduced, the process No. column 113f is a blank column.

The state column 113g stores information for specifying a state of the manufactured object specified in the manufactured object ID column 113a. In a case where the manufactured object specified in the manufactured object ID column 113a is not introduced, the state column 113g is a blank column.

The start time point column 113h stores information for specifying a time point at which processing of the process specified in the process No. column 113f is started for the manufactured object specified in the manufactured object ID column 113a. In a case where the manufactured object specified in the manufactured object ID column 113a is not introduced or in a case where the state column 113g indicates a construction waiting state or a construction stopped state, the start time point column 113h is a blank column.

The description is returned to FIG. 2. The resource plan storage area 114 stores plan information for each resource.

FIG. 6 illustrates an example of a data structure of the resource plan storage area. The resource plan storage area 114 stores information input from the resource information management device 170.

The resource plan storage area 114 includes a resource type column 114a, a resource ID column 114b, a work Gr column 114c, a quantity column 114d, a production date column 114e, an operation start time point column 114f, an operation end time point column 114g, and an operation time column 114h. The resource type column 114a, the resource ID column 114b, the work Gr column 114c, the quantity column 114d, the production date column 114e, the operation start time point column 114f, the operation end time point column 114g, and the operation time column 114h are associated one another.

The resource type column 114a stores information for specifying types of resources such as production facilities, workers, and jigs at the manufacturing site.

The resource ID column 114b stores information for uniquely identifying individual resources among the resources such as the production facilities, the workers, the jigs, and the like at the manufacturing site. In a case where the resource ID stored in the resource ID column 114b matches the information stored in the facility ID column 111j, the worker ID column 111k, and the jig ID column 115h in the M-BOM storage area 115 to be described below, the above indicate the same resource.

The work Gr column 114c stores information for specifying the work Gr (group, department) to which the resource specified in the resource ID column 114b belongs. However, in a case where the resource type column 114a is other than "Worker", the work Gr column 114c is a blank column.

The quantity column 114d stores information for specifying the quantity of resources specified in the resource ID column 114b.

The production date column 114e stores information for specifying a plan of a production date on which the resource specified in the resource ID column 114b is available.

The operation start time point column 114f stores information for specifying a plan of a start time point of operation time on the day specified in the production date column 114e for the resource specified by the resource ID column 114b.

The operation end time point column 114g stores information for specifying a plan of an end time point of the operation time of the plan starting at the time specified in the operation start time column 114f on the day specified in the production date column 114e for the resource specified in the resource ID column 114b.

The operation time column 114h stores information for specifying an operation time per resource in respect of the operation time, that starts from the time point specified in the operation start time point column 114f and ends at the time point of the operation end time point column 114g, on the day specified in the production date column 114e for the resource specified in the resource ID column 114b.

The description is returned to FIG. 2. The M-BOM storage area 115 stores information for specifying, for each type of the manufactured object, a manufacturing process of the manufactured object for each type, an available facility in each process, and necessary resource information (necessary workers and the number thereof, and necessary jigs).

FIG. 7 illustrates an example of a data structure of the M-BOM storage area. The M-BOM storage area 115 stores information input from the process information management device 160.

The M-BOM storage area 115 includes a type name column 115a, a process No. column 115b, a process name column 115c, a standard time column 115d, a quantity dependence column 115e, a work Gr column 115f, a number-of-workers column 115g, a jig ID column 115h, and a facility ID column 115j. The type name column 115a, the process No. column 115b, the process name column 115c, the standard time column 115d, the quantity dependence column 115e, the work Gr column 115f, the number-of-workers column 115g, the jig ID column 115h, and the facility ID column 115j are associated one another.

The type name column 115a stores information for specifying a type of the manufactured object. The process No. column 115b stores information for specifying a process No., which is identification information capable of uniquely identifying the manufacturing process of the manufactured object for the type specified in the type name column 115a.

The process name column 115c stores information for specifying a process name for identifying a process identified in the process No. column 115b for the type specified in the type name column 115a.

The standard time column 115d stores information for specifying a standard time required for manufacturing per unit of the manufactured object of the process specified in the process No. column 115b and the process name column 115c for the type specified in the type name column 115a.

The quantity dependence column 115e stores information for specifying presence/absence of quantity dependence of processing time of the process specified in the process No. column 115b and the process name column 115c for the type specified in the type name column 115a.

The work Gr column 115f stores information for specifying a work Gr to which the worker, which is necessary for the process specified in the process No. column 115b and the process name column 115c, belongs for the type specified in the type name column 115a.

The number-of-workers column 115g stores information for specifying the necessary number of workers specified in the work Gr column 115f necessary for the process specified in the process No. column 115b and the process name column 115c for the type specified in the type name column 115a.

The jig ID column 115h stores information for specifying a jig planned and necessary for the process specified in the process No. column 115b and the process name column 115c for the type specified in the type name column 115a.

The facility ID column 115j stores information for specifying a facility that can be used in the process specified in the process No. column 115b and the process name column 115c for the type specified in the type name column 115a. For example, in the present embodiment, all the facility IDs that can be used in the process specified in the process No. column 115b and the process name column 115c are listed in the facility ID column 115j, such as a facility 1ID column 115k, a facility 2ID column 115m, and a facility 3ID column 115n . . . .

The description is returned to FIG. 2. The delay risk storage area 116 stores delay risk information calculated by comparing a past process actual result and a process plan actual result for each type and for each process.

FIG. 8 illustrates an example of a data structure of the delay risk storage area. The delay risk storage area 116 stores information generated by the dynamic production planning device 100.

The delay risk storage area 116 includes a type name column 116a, a process No. column 116b, a process name column 116c, a work delay risk column 116d, a construction delay risk column 116e, and an upstream delay risk column 116f. The type name column 116a, the process No. column 116b, the process name column 116c, the work delay risk column 116d, the construction delay risk column 116e, and the upstream delay risk column 116f are associated one another.

The type name column 116a stores information for specifying a type of the manufactured object. The process No. column 116b stores information for specifying a process No., which is identification information capable of uniquely identifying a manufacturing process of the manufactured object, for the type specified in the type name column 116a.

The process name column 116c stores information for specifying a process name for identifying the process identified in the process No. column 116b for the type specified in the type name column 116a.

The work delay risk column 116d stores information for specifying a value obtained by indexing a risk of occurrence of a process delay caused by an extended work time in the process specified in the process No. column 116b and the process name column 116c for the type specified in the type name column 116a. A method of calculating the value stored in the work delay risk column 116d will be described later with reference to FIG. 13 and FIG. 14.

The construction delay risk column 116e stores information for specifying a value obtained by indexing a risk of occurrence of a delay due to waiting for construction in the process specified in the process No. column 116b and the process name column 116c for the type specified in the type name column 116a. A method of calculating the value stored in the construction delay risk column 116e will be described later with reference to FIG. 13 and FIG. 14.

The upstream delay risk column 116f stores information for specifying a value obtained by indexing a risk of occurrence of a delay due to transmission of an upstream process delay in the process specified by the process No. column 116b and the process name column 116c for the type specified in the type name column 116a. A method of calculating the value stored in the upstream delay risk column 116f will be described later with reference to FIG. 13 and FIG. 14.

The description is returned to FIG. 2. The resource history storage area 117 stores a possibility of reduction the work time specified by the comparison of the past process actual result and the process plan, and an alternative facility that is an unplanned but available facility, for each type of the manufactured object and each process.

FIG. 9 illustrates an example of a data structure of the resource history storage area. The resource history storage area 117 stores information generated by the dynamic production planning device 100.

The resource history storage area 117 includes a type name column 117a, a process No. column 117b, a process name column 117c, a minimum process time column 117d, and an alternative facility ID column 117e. The type name column 117a, the process No. column 117b, the process name column 117c, the minimum process time column 117d, and the alternative facility ID column 117e are associated one another.

The type name column 117a stores information for specifying the type of the manufactured object. The process No. column 117b stores information for specifying a process No., which is identification information capable of uniquely identifying the manufacturing process of the manufactured object for the type specified in the type name column 117a.

The process name column 117c stores information for specifying a process name for identifying the process identified in the process No. column 117b for the type specified in the type name column 117a.

The minimum process time column 117d stores a minimum value extracted from the process actual result for the process time per unit of the manufactured object of the process specified in the process No. column 116b and the process name column 116c for the type specified in the type name column 117a. A method of calculating the value stored in the minimum process time column 117d will be described later with reference to FIG. 15.

The alternative facility ID column 117e stores a facility ID that is applied to the type specified in the type name column 117a and is extracted as a facility having the history processed based on the process actual result although not being designated as a facility allocated in the facility ID column 115j of the M-BOM storage area 115 in a planned way for the process specified in the process No. column 116b and the process name column 116c. A method of extracting the facility ID stored in the alternative facility ID column 117e will be described later with reference to FIG. 15. The alternative facility ID column 117e is divided into an alternative facility 1ID column 117f, an alternative facility 2ID column 117g, an alternative facility 3ID column 117h, or divided into more columns, and all extracted facility IDs are listed.

The description is returned to FIG. 2. The operation time upper limit storage area 118 stores an upper limit of operation time per day of the resource extracted from the past process actual result for each resource and each day of a week.

FIG. 10 illustrates an example of a data structure of the operation time upper limit storage area. The operation time upper limit storage area 118 stores information generated by the dynamic production planning device 100.

The operation time upper limit storage area 118 includes a resource type column 118a, a resource ID column 118b, a work Gr column 118c, a quantity column 118d, a day of week column 118e, a normal operation time column 118f, and an operation time upper limit column 118g. The resource type column 118a, the resource ID column 118b, the work Gr column 118c, the quantity column 118d, the day of week column 118e, the normal operation time column 118f, and the operation time upper limit column 118g are associated one another.

The resource type column 118a stores information for specifying a type of a resource. The resource ID column 118b stores information for uniquely identifying the resource. In a case where the resource ID stored in the resource ID column 118b matches information stored in the facility ID column 111j, the worker ID column 111k, and the jig ID column 115h in the M-BOM storage area 115 to be described below, the above indicate the same resource.

The work Gr column 118c stores information for specifying a work Gr to which the resource specified in the resource ID column 118b belongs. In a case where the resource type column 118a is other than "Worker" ("Machine" or "Jig", etc., other types), the work Gr column 118c is a blank column.

The quantity column 118d stores information for specifying the quantity of resources specified in the resource ID column 118b.

The day of week column 118e stores information for specifying a day of the week. A case where the day of week column 118e is a blank column indicates that the values of the normal operation time column 118f and the operation time upper limit column 118g of the resource specified in the resource ID column 118b do not depend on the day of the week.

The normal operation time column 118f stores information for specifying a mode value of the operation time per day calculated from the plan actual result stored in the process plan actual result storage area 112 in respect of the day of the week specified in the day of week column 118e for the resource specified in the resource ID column 118b. A method of calculating the value stored in the normal operation time column 118f will be described later with reference to FIG. 16.

The operation time upper limit column 118g stores information for specifying a maximum value of the operation time per day calculated from the plan actual result stored in the process actual result storage area 111 in respect of the day of the week specified in the day of week column 118e for the resource specified in the resource ID column 118b. A method of calculating the value stored in the operation time upper limit column 118g will be described later with reference to FIG. 16.

The description is returned to FIG. 2. The recovery scenario storage area 119 stores a recovery scenario for eliminating the delay for each type and for each process.

FIG. 11 illustrates an example of a data structure of the recovery scenario storage area. The information stored in the recovery scenario storage area 119 is generated by the dynamic production planning device 100.

The recovery scenario storage area 119 includes a type name column 119a, a process No. column 119b, a process name column 119c, a recovery scenario presence/absence column 119d, an alternative facility presence/absence column 119e, a process time shortening possibility column 119f, an operation time extension possibility column 119g, and a recovery sequence column 119h. The type name column 119a, the process No. column 119b, the process name column 119c, the recovery scenario presence/absence column 119d, the alternative facility presence/absence column 119e, the process time shortening possibility column 119f, the operation time extension possibility column 119g, and the recovery sequence column 119h are associated one another.

The type name column 119a stores information for specifying a type of the manufactured object. The process No. column 119b stores information for specifying a process No., which is identification information capable of uniquely identifying a manufacturing process of the manufactured object for the type specified in the type name column 119a.

The process name column 119c stores information for specifying a process name for identifying a process identified in the process No. column 119b for the type specified in the type name column 119a.

The recovery scenario presence/absence column 119d stores information for specifying the presence or absence of a recovery scenario in a case where a delay occurs in the process specified in the process No. column 119b and the process name column 119c for the type specified in the type name column 119a.

The alternative facility presence/absence column 119e stores information for specifying the presence or absence of an available alternative facility for recovery in a case where a delay occurs in the process specified in the process No. column 119b and the process name column 119c for the type specified in the type name column 119a.

The process time shortening possibility column 119f stores information for specifying whether the process time can be shortened and processed for recovery in a case where a delay occurs in the process specified by the process No. column 119b and the process name column 119c for the type specified in the type name column 119a. In a case where the process time shorter than the standard process time is included in the actual result of the process time, it can be said that the process is a process where a shortening processing is possible.

The operation time extension possibility column 119g stores information for specifying whether the operation time of the worker can be extended for recovery in a case where a delay occurs in the process specified in the process No. column 119b and the process name column 119c for the type specified in the type name column 119a. In a case where an operation time longer than the standard operation time is included in the actual result of the operation time, it can be said that the process is a process where processing for extending the worker operation time is possible.

The recovery sequence column 119h stores either information of "UPSTREAM" that designates a preceding process or information of "CURRENT" that designates a current process. The information stored in the recovery sequence column 119h is information for specifying a process to be a target of generating the recovery scenario in a case where a delay risk is equal to or more than a certain level in the process.

The information stored in the recovery scenario presence/absence column 119d, the alternative facility presence/absence column 119e, the process time shortening possibility column 119f, the operation time extension possibility column 119g, and the recovery sequence column 119h is generated in recovery scenario generating processing illustrated in FIG. 17.

The description is returned to FIG. 2. The control unit 120 of the dynamic production planning device 100 includes an actual result collection unit 121, a delay risk estimation unit 122, a resource history estimation unit 123, an operation time upper limit estimation unit 124, a recovery scenario generating unit 125, and a simulation evaluation unit 126.

At a predetermined time (for example, each day) or at a specified time, the actual result collection unit 121 acquires information to be stored in the process actual result storage area 111 from the production actual result management device 190, acquires information to be stored in the process plan actual result storage area 112 and the production plan storage area 113 from the production plan management device 180, acquires information to be stored in the resource plan storage area 114 from the resource information management device 170, and further acquires information to be stored in the M-BOM storage area 115 from the process information management device 160, so as to update the process actual result storage area 111, the process plan actual result storage area 112, the production plan storage area 113, the resource plan storage area 114, and the M-BOM storage area 115.

At a predetermined time (for example, each day) or at a specified time, the delay risk estimation unit 122 acquires information stored in the process actual result storage area 111 and the process plan actual result storage area 112, generates information to be stored in the delay risk storage area 116, and updates the delay risk storage area 116 in accordance with a flowchart of delay risk estimation processing illustrated in FIG. 13 to be described below.

At a predetermined time (for example, each day) or at a specified time, the resource history estimation unit 123 acquires information stored in the process actual result storage area 111, the process plan actual result storage area 112, and the M-BOM storage area 115, generates information to be stored in the resource history storage area 117, and updates the resource history storage area 117 in accordance with a flowchart of resource history estimation processing illustrated in FIG. 15 to be described below.

At a predetermined time (for example, each day) or at a specified time, the operation time upper limit estimation unit 124 acquires information stored in the process actual result storage area 111 and the process plan actual result storage area 112, generates information to be stored in the operation time upper limit storage area 118, and updates the operation time upper limit storage area 118 in accordance with a flowchart of operation time upper limit estimation processing illustrated in FIG. 16 to be described below.

At a predetermined time (for example, each day) or at a specified time, the recovery scenario generating unit 125 acquires information stored in the delay risk storage area 116, the resource history storage area 117, and the operation time upper limit storage area 118, generates information to be stored in the recovery scenario storage area 119, and updates the recovery scenario storage area 119 in accordance with a flowchart of recovery scenario generating processing illustrated in FIG. 17 to be described below.

At a predetermined time (for example, each day) or at a specified time, the simulation evaluation unit 126 acquires information stored in the process actual result storage area 111, the process plan actual result storage area 112, the production plan storage area 113, the resource plan storage area 114, the M-BOM storage area 115, and the recovery scenario storage area 119, generates a progress plan of processing of all manufactured objects in a specified plan period from the present to the future, and creates output information in a form of an output screen 500 as shown in FIG. 19 in accordance with a flowchart of simulation processing illustrated in FIG. 18 to be described below.

The simulation evaluation unit 126 creates a simulation model of a production process in a factory on a computer. In the model, the simulation evaluation unit 126 simulates a time transition of an entire manufacturing lines and production processes, and creates a progress plan for all manufactured objects introduced into the manufacturing lines by reproducing, on a computer, progress constraints caused by manufacturing devices, workers, and other manufactured objects according to a process path for each type and various dispatch rules for determining a processing priority between the manufactured objects. The simulation evaluation unit 126 can output various statistical values, such as products/types, processes, steps, manufacturing devices, workers, and the like, from the created progress plan of all manufactured objects as production index information.

Although a difference in accuracy of a simulation result is predicted according to the actual information and the accuracy considered in the simulation model, a simulation method of an existing simulator is used without being specified in the present embodiment. For example, a simulation method of a discrete event type is generally used in a simulation of a production process in a factory.

In addition, when the simulation model is created, an input specification unique to the present embodiment is provided, and data that is input according to the input specification and included in the simulation model can be executed.

The input unit 130 receives input of information. The output unit 140 outputs information. The communication unit 150 transmits and receives information to and from another device connected to the network 50 via the network 50.

FIG. 12 illustrates an example of a hardware configuration of the dynamic production planning device. The dynamic production planning device 100 can be realized by a general computer 900, or a network system including a plurality of the computers 900. The computer 900 includes a central processing unit (CPU) 901, a memory 902, an external storage unit 903 such as an hard disk drive (HDD), a read/write device 905 that reads and writes information with respect to a portable storage medium 904 such as a compact disk (CD) or a digital versatile disk (DVD), an input device 906 such as a keyboard, a mouse, and a bar code reader, an output device 907 such as a display, and a communication device 908 that communicates with another computer via the network 50 for communication such as the Internet.

For example, the control unit 120 can be realized by loading a predetermined program stored in the external storage unit 903 onto the memory 902 and executing the program by the CPU 901, the input unit 130 can be realized by the CPU 901 using the input device 906, the output unit 140 can be realized by the CPU 901 using the output device 907, the communication unit 150 can be realized by the CPU 901 using the communication device 908, and the storage unit 110 can be realized by the CPU 901 using the memory 902 or the external storage unit 903.

The predetermined program may be downloaded into the external storage unit 903 from the storage medium 904 via the read/write device 905 or from the network via the communication device 908, and then loaded onto the memory 902 and executed by the CPU 901.

In addition, the predetermined program may also be directly loaded onto the memory 902 from the storage medium 904 via the read/write device 905 or from the network via the communication device 908, and executed by the CPU 901.

The production actual result management device 190, the process information management device 160, the resource information management device 170, and the production plan management device 180 can also be realized by the general computer 900 as shown in FIG. 12.

FIG. 13 illustrates an example of a flow of the delay risk estimation processing. The delay risk estimation processing is started at a predetermined time (for example, each day) or when an instruction to start the processing is issued to the dynamic production planning device 100.

First, the actual result collection unit 121 acquires a process actual result in a specified period from the process actual result storage area 111 (step S1221). Then, the processes of step S1223 to step S1226 to be described below are repeated with all process actual results as a target (step S1222 and step S1227).

The delay risk estimation unit 122 acquires a process plan of the process actual result from the process plan actual result storage area 112, and extracts a process plan actual result with a latest planned date (step S1223).

Then, the delay risk estimation unit 122 obtains a time difference AT between an end time point and a start time point of the process actual result, and a time difference ST between an end time point and a start time point of the process plan actual result, and calculates a work delay risk in accordance with the following Formula (1) (step S1224).

$$\frac{AT - ST}{ST} \quad \text{[Formula 1]}$$

Then, the delay risk estimation unit 122 calculates a construction delay risk from a time difference WT between a start time point of the process actual result and a previous process end time point, and the time difference ST between the end time point and the start time point of the process plan actual result in accordance with the following Formula (2) (step S1225).

$$\frac{WT}{ST} \quad \text{[Formula 2]}$$

Then, the delay risk estimation unit 122 calculates an upstream delay risk from a time difference D between the start time point of the process actual result and the start time point of the process plan actual result, the time difference WT between the start time point of the process actual result and the previous process end time point, and the time difference ST between the end time point and the start time point of the process plan actual result in accordance with the following Formula (3) (step S1226).

$$\frac{D - WT}{ST} \quad \text{[Formula 3]}$$

Then, when the repetition is ended (step S1227), the delay risk estimation unit 122 calculates statistical values (average value of a designated period) of the work delay risk, the construction delay risk, and the upstream delay risk for each combination of the type and the process, and stores the values in the delay risk storage area 116 (step S1228). The statistical value calculated here is not limited to an average value, and may also be a median value or a mode value.

The above is an example of the flow of the delay risk estimation processing. According to the delay risk estimation processing, a difference between a planned date and time and an actual result date and time of the process can be obtained, and a statistical value of the delay risk of the process can be obtained.

FIG. 14 illustrates a calculation structure of various risks. In the above-described step S1224 to step S1226, the work delay risk, the construction delay risk, and the upstream delay risk are calculated respectively, and the values of S, AT, WT, and D used for the calculation are in a relationship shown in the figure.

That is, ST is the time difference between the end time point and the start time point of the process plan actual result, and illustrates a time planned as a time required for the process. AT is the time difference between the end time point and the start time point of the process actual result and is a time actually required for the process. WT is the time difference between the start time point of the process actual result and the previous process end time point, and is an actual result of waiting time from an end of the previous process to a start of the process. D is the time difference between the start time point of the process actual result and the start time point of the process plan actual result, and is a delay actual result of the process start time with respect to the plan.

FIG. 15 illustrates an example of a flow of the resource history estimation processing. The resource history estimation processing is started following the delay risk estimation processing. Alternatively, the processing is started at a predetermined time (for example, each day) or when an instruction to start processing is issued to the dynamic production planning device 100.

First, the resource history estimation unit 123 extracts and lists processable (usable) facilities from the M-BOM storage area 115 for all combinations of types and processes (step S1231). Then, the resource history estimation unit 123 repeatedly performs processing of step S1233 to step S1237 to be described below with all the types as a target (step S1232 and step S1238).

Then, the resource history estimation unit 123 repeatedly performs processing of step S1234 to step S1236 to be described below with all the processes as a target (step S1233 and step S1237).

The resource history estimation unit 123 acquires all the process actual results specified in the type and the process from the process actual result storage area 111 (step S1234).

Then, the resource history estimation unit 123 specifies a minimum process time of each process using the process actual results (step S1235). Specifically, the resource history estimation unit 123 calculates the process time (a value of time difference between the end time point and the start time point divided by quantity in a case where the quantity dependence exists, or a time difference between the end time point and the start time point in a case where the quantity dependence does not exist) for each process actual result, and stores a minimum value in the minimum process time column 117d of the resource history storage area 117.

Next, the resource history estimation unit 123 specifies a facility that has an actual result used in the process but is not planned to be used as an alternative facility (step S1236). Specifically, the resource history estimation unit 123 extracts an actual result facility, and stores the actual result facility in the alternative facility ID column 117e of the resource history storage area 117 when there is a facility not included in the list of the processable facility extracted in step S1231, for each process actual result. Then, the resource history estimation unit 123 ends the repetition (step S1237 and step S1238).

The above is an example of the flow of the resource history estimation processing. According to the resource history estimation processing, it is possible to specify a minimum process time that is an actual result and an alternative facility that is an actual result for each process.

FIG. 16 illustrates an example of a flow of the operation time upper limit estimation processing. The operation time upper limit estimation processing is started following the resource history estimation processing. Alternatively, the processing is started at a predetermined time (for example, each day) or when an instruction to start processing is issued to the dynamic production planning device 100.

First, the operation time upper limit estimation unit 124 extracts all resources from the resource plan storage area 114 (step S1241). Then, the operation time upper limit estimation unit 124 repeatedly performs processing of step S1243 to step S1246 to be described below with all individual resources as a target (step S1242 and step S1247).

The operation time upper limit estimation unit 124 acquires actual results (including the operation time and the day of week) related to a resource of a specified period from the process actual result storage area 111 (step S1243).

Then, the operation time upper limit estimation unit 124 specifies a maximum operation time value for each day of week in respect of the target resource (step S1244). Specifically, the operation time upper limit estimation unit 124 calculates daily operation time, and calculates a maximum operation time value for each day of week in respect of the target resource. The operation time upper limit estimation unit 124 stores an operation time upper limit in the operation time upper limit storage area 118 for each day of week in a case where the maximum value is different for each day of week, and stores a single operation time upper limit in the operation time upper limit storage area 118 in a case where the maximum value is the same for all days of week.

Then, the operation time upper limit estimation unit 124 specifies a process plan (normal operation time) in an initial plan in respect of the target resource (step S1245). Specifically, the operation time upper limit estimation unit 124 acquires a process plan of a specified period from the process plan actual result storage area 112, extracts a process plan with a first planned date in a case where a plurality of plans exist, and further acquires a process plan related to a specified resource.

Then, the operation time upper limit estimation unit 124 calculates a daily operation time, calculates a mode value of the operation time for each day of week, and stores the operation time and the mode value in the normal operation time column 118f of the operation time upper limit storage area 118 (step S1246). Here, in a case where there is no data for the day of week, the mode value is stored as the normal operation time. Then, the operation time upper limit estimation unit 124 ends the repetition (step S1247).

The above is an example of the flow of the operation time upper limit estimation processing. According to the operation time upper limit estimation processing, the upper limit of the operation time that is an actual result and the normal operation time can be estimated for each resource.

FIG. 17 illustrates an example of a flow of the recovery scenario generating processing. The recovery scenario generating processing is started following the operation time upper limit estimation processing. Alternatively, the processing is started at a predetermined time (for example, each day) or when an instruction to start processing is issued to the dynamic production planning device 100.

First, the recovery scenario generating unit 125 extracts all combinations of types and processes and each standard time, facility, worker, and jig from the M-BOM storage area 115 (step S1251).

Next, the recovery scenario generating unit 125 repeats processing of step S1253 to step S1258 in respect of all types (step S1252 and step S1259). Then, the recovery scenario generating unit 125 repeats processing of steps S1254 to S1257 with all processes as a target (step S1253 and step S1258).

Next, the recovery scenario generating unit 125 specifies the presence or absence of an available alternative facility other than the planned facility (step S1254). Specifically, the recovery scenario generating unit 125 stores "PRESENT" or "ABSENT" ("PRESENT" if there is an alternative facility) in the alternative facility presence/absence column 119e of the recovery scenario storage area 119 in accordance with the presence or absence of data stored in the alternative facility ID column 117e of the resource history storage area 117.

Then, the recovery scenario generating unit 125 specifies whether the process time can be shortened (step S1255). Specifically, the recovery scenario generating unit 125 extracts a minimum process time of the target type and process from the resource history storage area 117, and stores "NO" or "YES" ("NO" in a case where the minimum process time is greater than the standard time) in the process time shortening possibility column 119f of the recovery scenario storage area 119 in accordance with a comparison of being longer or shorter than the standard time.

Then, the recovery scenario generating unit 125 specifies whether the operation time can be extended (step S1256). Specifically, the recovery scenario generating unit 125 stores "YES" or "NO" ("YES" in a case where the upper limit of the operation time is greater than the normal operation time) in the operation time extension possibility column 119g of the recovery scenario storage area 119 in accordance with whether a value of the operation time upper limit column 118g of the operation time upper limit storage area 118 is larger than the value of the normal operation time column 118 in the facility, the worker, and the jig of the corresponding type and process.

Next, the recovery scenario generating unit 125 specifies a recovery sequence in accordance with the delay risk (step S1257). Specifically, the recovery scenario generating unit 125 acquires the delay risk in respect of the target type and process from the delay risk storage area 116. Then, the process is performed, the recovery scenario generating unit 125 stores "UPSTREAM" in the recovery sequence column 119h of the recovery scenario storage area 119 when the work delay risk and the construction delay risk are smaller than the statistical values (average value, median value, mode value, and the like) of the work delay risks or the construction delay risks of all the combinations of types and processes and the upstream delay risk is larger than the statistical value (average value, median value, mode value, and the like) of the upstream delay risk of all the combinations of types and processes, and stores "PRESENT" therein in other cases. In addition, the recovery scenario generating unit 125 stores "PRESENT" in the recovery scenario presence/absence column 119d if any of the following is satisfied: the alternative facility is present, the process time can be shortened, or the operation time can be extended.

Then, the recovery scenario generating unit 125 ends the repetition (step S1258 and step S1259).

The above is an example of the flow of the recovery scenario generating processing. An order in which measures are taken for the delay recovery and the presence/absence of resources that can be used for the recovery can be specified according to the recovery scenario generating processing.

FIG. 18 illustrates an example of a flow of the simulation processing. The simulation processing is started following the recovery scenario generating processing. Alternatively, the processing is started at a predetermined time (for example, each day) or when an instruction to start processing is issued to the dynamic production planning device 100.

First, the simulation evaluation unit 126 extracts the processes in a descending order of the delay (step S1261). Specifically, the simulation evaluation unit 126 acquires progress information for each manufactured object from the production plan storage area 113, specifies processes with which a difference of a (latest) plan with a newest planned date of the process plan actual storage area 112 is equal to or more than a predetermined threshold (for example, equal to or more than a predetermined value dependent on ST), and extracts the processes as a delay process list in a descending order of the difference.

Then, the simulation evaluation unit 126 replaces a process in which the recovery sequence is "UPSTREAM" among the process included in the delay process list with an upstream process because it is effective to apply the recovery scenario with the upstream process as a target (step S1262). Specifically, the simulation evaluation unit 126 determines whether "UPSTREAM" is stored in the recovery sequence column 119h of the recovery scenario storage area 119 for each process of the delay process list, if "UPSTREAM" is stored, a process group at the upstream of the current process is rearranged in a descending order of a sum of the work delay risk and the construction delay risk, the current process is replaced with a process having the largest sum, and the current process is deleted from the list.

Then, the simulation evaluation unit 126 repeats processing of step S1264 and step S1265 to be described below, with a process on an i-th position of the delay process list (i is a positive integer with an initial value of 1) as a target (step S1263).

The simulation evaluation unit 126 determines whether there is a recovery scenario in the current process (step S1264). Specifically, the simulation evaluation unit 126 determines whether "PRESENT" is stored in the recovery scenario presence/absence column 119d of the recovery scenario storage area 119 of the current process. In a case where "PRESENT" is stored ("Yes" in step S1264), the simulation evaluation unit 126 advances the control to step S1265, and in a case where "PRESENT" is not stored ("No" in step S1264), the simulation evaluation unit 126 advances the control to step S1266.

The simulation evaluation unit 126 verifies the effect of the recovery scenario by simulation (step S1265). Specifically, the simulation evaluation unit 126 uses information obtained by reading the production plan storage area 113, the resource plan storage area 114, and the M-BOM storage area 115 to verify the effect of the recovery scenario by simulation processing in which the recovery scenario is set as an input. More specifically, in the simulation processing, the recovery scenario generating unit 125 creates a recovery scenario, and the simulation evaluation unit 126 creates a simulation model of the production process in the factory on the computer, and creates a production plan.

In the simulation model, the simulation evaluation unit 126 simulates a time transition of an entire manufacturing lines and production processes, and creates a progress plan for all manufactured objects introduced into the manufacturing lines by reproducing, on a computer, progress constraints caused by manufacturing devices, workers, and other manufactured objects according to a process path for each product and various dispatch rules for determining a processing priority between the manufactured objects. The simulation evaluation unit 126 can output various statistical values, such as products/types, processes, steps, manufacturing devices, workers, and the like, from the created progress plan of all manufactured objects as production index information.

Although a difference in accuracy of a simulation result is predicted according to the actual information and the accuracy considered in the simulation model, a simulation method of an existing simulator is used without being specified in the present embodiment. For example, a simulation method of a discrete event type is generally used in a simulation of a production process in a factory.

In addition, when the simulation model is created, an input specification unique to the present embodiment is provided, and data that is input according to the input specification and included in the simulation model can be executed.

The recovery scenario generating unit 125 uses the estimated alternative facility and the estimated upper limit of time spent on production, and uses any or all of utilization of the alternative facility, addition of time spent on production to the upper limit of time spent on production, and shortening of process time by applying the shortest time spent on production to create a recovery scenario of a delay.

For example, the recovery scenario generating unit 125 creates an available scenario among a recovery scenario of the delay that utilizes the alternative facility, a recovery scenario of the delay that utilizes the alternative facility and adds time spent on production to the upper limit of time spent on production, and a recovery scenario of the delay that adopts the utilization of the alternative facility, addition of time spent on production to the upper limit of time spent on production, and shortening of process time by applying the shortest time among the time spent on production.

In addition, the simulation evaluation unit 126 specifies an alternative facility necessary for the addition, time spent on production for each item and process, and a cost based on a production plan to be created.

Next, the simulation evaluation unit 126 determines whether the index i matches the number of elements (the number of processes) included in the delay process list (step S1266).

In a case where the index i does not match the number of elements (the number of processes) included in the delay process list ("No" in step S1266), the simulation evaluation unit 126 increments the index (i+1 is substituted for i) (step S1267). Then, the simulation evaluation unit 126 returns the control to step S1264.

In a case where the index i matches the number of elements (the number of processes) included in the delay process list ("Yes" in step S1266), the simulation evaluation unit 126 displays a recovery plan of a recovery-possible scenario of the delay (step S1268).

The above is an example of the flow of the simulation processing. According to the simulation processing, a countermeasure to be taken for the delay recovery can be created as a plurality of scenarios, and the effect of each scenario can be specified.

FIG. 19 illustrates an example of an output screen of the simulation processing. The output screen 500 includes a manufactured object ID selection area 501, a production plan display area 502, a date-of-delivery display area 503, and a recovery price display area 504. In the output screen 500 displayed on the output unit 140, when an input is received in the manufactured object ID selection area 501 via the input unit 130, a Gantt chart, which is the result of the simulation processing, a delay amount of the date of delivery, and a price of alternative facility utilization, overtime extension, addition cost, and the like are output on the production plan display area 502, the date-of-delivery display area 503, and the recovery price display area 504.

The above is the configuration example of the dynamic production planning system according to the first embodiment of the invention. According to the first embodiment, it is possible to quickly provide an effective recovery plan for the delay problem occurring at the manufacturing site.

The embodiment described above is detailed for easy understanding but the invention is not necessarily limited to include all the above configurations. A part of the configuration of the embodiment may be replaced with another configuration, and the configuration of another embodiment can be added to the configuration of the embodiment. In addition, a part of the configuration of the embodiment may also be deleted.

In addition, some or all of the above-described configurations, functions, processing units, and the like may be achieved by hardware by designing, for example, an integrated circuit. In addition, the above-described units, configurations, functions, and the like may also be realized by software by a processor interpreting and executing a program for realizing the respective functions. Information of such as a program for realizing the respective functions, a table, and a file can be placed in a memory, a storage device such as a hard disk, or a storage medium such as an IC card, an SD card, or a DVD.

The control lines and the information lines according to the embodiment indicate what is considered necessary for the description, and not all the control lines and the information lines in the product are necessarily shown. Actually, it may also be considered that almost all of the configurations are connected to each other. The invention has been described above centered on the embodiment.

REFERENCE SIGN LIST 10 dynamic production planning system
50 network
100 dynamic production planning device
160 process information management device
170 resource information management device
180 production plan management device
190 production actual result management device

The invention claimed is:

1. A dynamic production planning system, comprising:
a dynamic production planning device including a memory coupled to a processor, the memory storing instructions that when executed configure the processor to execute:
a process actual result storage unit that includes a record of time spent on production for each item and process;
a process plan actual result storage unit that includes a production facility of which usage is planned and assumed work time thereof for each item and process;
a recovery scenario generating unit configured to calculate, for each item and process, an index indicating a risk of a delay using the time spent on production and the production facility of which usage is planned and the assumed work time thereof for each item and process;
a resource history storage unit that includes a record of a production facility used for each item and process;
a resource history estimation unit configured to estimate an alternative facility for each item and process; and
an operation time upper limit estimation unit configured to estimate an upper limit of the time spent on production for each item and process,
wherein the recovery scenario generating unit is configured to create a recovery scenario of a delay using the estimated alternative facility and the estimated upper limit of the time spent on production.

2. The dynamic production planning system according to claim 1, wherein
the processor of the dynamic production planning device is configured to execute:
a simulation evaluation unit, wherein
the simulation evaluation unit is configured to specify a process in which a delay of production occurs, and calculate an effect of each recovery scenario for the delay.

3. The dynamic production planning system according to claim 1, wherein
the processor of the dynamic production planning device is configured to execute:
a simulation evaluation unit, wherein
the simulation evaluation unit is configured to specify a process in which a delay of production occurs, and calculate an effect of each recovery scenario for the delay in an order of the index that indicates the risk of the delay.

4. The dynamic production planning system according to claim 1, wherein
the processor of the dynamic production planning device is configured to execute:
a simulation evaluation unit, wherein
the simulation evaluation unit is configured to specify a process in which a delay of production occurs, and specify an additionally required alternative facility, time spent on production for each item and process, and a cost as an effect of each recovery scenario for the delay.

5. The dynamic production planning system according to claim 1, wherein
the processor of the dynamic production planning device is configured to execute:
a simulation evaluation unit, wherein
the recovery scenario generating unit is configured to create the recovery scenario of they delay using the estimated alternative facility and the estimated upper limit of the time spent on production, and using any or all of utilization of the alternative facility, addition of time spent on production to the upper limit of the time spent on production, and shortening of process time by applying a shortest time among the time spent on the production, and
the simulation evaluation unit is configured to specify a process in which a delay of production occurs, and specify an additionally required alternative facility, time spent on production for each item and process, and a cost as an effect of each recovery scenario for the delay.

6. The dynamic production planning system according to claim 1, wherein
the processor of the dynamic production planning device is configured to execute:
a simulation evaluation unit, wherein
the recovery scenario generating unit is configured to create the recovery scenario of the delay that utilizes the alternative facility; a recovery scenario of the delay that utilizes the alternative facility and adds time spent on production to the upper limit of the time spent on the production; and a recovery scenario of the delay that adopts utilization of the alternative facility, addition of time spent on production to the upper limit of the time spent on production, and shortening of process time by applying a shortest time among the time spent on production, and
the simulation evaluation unit is configured to specify a process in which a delay of production occurs, and specify an additionally required alternative facility, time spent on production for each item and process, and a cost as an effect of each recovery scenario for the delay.

7. A dynamic production planning device, comprising:
a memory coupled to a processor, the memory storing instructions that when executed configure the processor to execute:
a process actual result storage unit that includes a record of time spent on production for each item and process;
a process plan actual result storage unit that includes a production facility of which usage is planned and assumed work time thereof for each item and process;
a recovery scenario generating unit configured to calculate, for each item and process, an index indicating a risk of a delay using the time spent on production and the production facility of which usage is planned and the assumed work time thereof for each item and process;
a resource history storage unit that includes a record of a production facility used for each item and process;
a resource history estimation unit configured to estimate an alternative facility for each item and process; and
an operation time upper limit estimation unit configured to estimate an upper limit of the time spent on production for each item and process,
wherein the recovery scenario generating unit is configured to create a recovery scenario of a delay using the estimated alternative facility and the estimated upper limit of the time spent on production.

8. The dynamic production planning device according to claim 7,
wherein the processor is configured to execute:
a simulation evaluation unit, wherein
the simulation evaluation unit is configured to specify a process in which a delay of production occurs, and calculate an effect of each recovery scenario for the delay.

9. The dynamic production planning device according to claim 7,
wherein the processor is configured to execute:
a simulation evaluation unit, wherein
the simulation evaluation unit is configured to specify a process in which a delay of production occurs, and calculate an effect of each recovery scenario for the delay in an order of the index that indicates the risk of the delay.

10. The dynamic production planning device according to claim 7,
wherein the processor is configured to execute:
a simulation evaluation unit, wherein
the simulation evaluation unit is configured to specify a process in which a delay of production occurs, and specify an additionally required alternative facility, time spent on production for each item and process, and a cost as an effect of each recovery scenario for the delay.

11. The dynamic production planning device according to claim 7,
wherein the processor is configured to execute:
a simulation evaluation unit, wherein
the recovery scenario generating unit is configured to create the recovery scenario of the delay using the estimated alternative facility and the estimated upper limit of the time spent on production, and using any or all of utilization of the alternative facility, addition of time spent on production to the upper limit of the time spent on production, and shortening of process time by applying a shortest time among the time spent on the production, and
the simulation evaluation unit is configured to specify a process in which a delay of production occurs, and specify an additionally required alternative facility, time spent on production for each item and process, and a cost as an effect of each recovery scenario for the delay.

12. The dynamic production planning device according to claim 7,
wherein the processor is configured to execute:
a simulation evaluation unit, wherein
the recovery scenario generating unit is configured to create a recovery scenario of the delay that utilizes the alternative facility; a recovery scenario of the delay that utilizes the alternative facility and adds time spent on production to the upper limit of the time spent on production; and a recovery scenario of the delay that adopts utilization of the alternative facility, addition of time spent on production to the upper limit of the time spent on production, and shortening of process time by applying a shortest time among the time spent on production, and
the simulation evaluation unit is configured to specify a process in which a delay of production occurs, and specify an additionally required alternative facility, time spent on production for each item and process, and a cost as an effect of each recovery scenario for the delay.

\* \* \* \* \*